(12) United States Patent
Ur-Rahman et al.

(10) Patent No.: US 10,116,752 B2
(45) Date of Patent: Oct. 30, 2018

(54) SYSTEM AND METHOD FOR BRIDGING DIVERGENT INFORMATION NETWORKS

(71) Applicant: KAROS HEALTH INCORPORATED, Waterloo (CA)

(72) Inventors: Sumair Ur-Rahman, Waterloo (CA); Michel Pawlicz, Kitchener (CA)

(73) Assignee: KAROS HEALTH INCORPORATED, Waterloo, Ontario (CA)

( * ) Notice: Subject to any disclaimer, the term of this patent is extended or adjusted under 35 U.S.C. 154(b) by 260 days.

(21) Appl. No.: 14/489,071

(22) Filed: Sep. 17, 2014

(65) Prior Publication Data

US 2015/0081846 A1    Mar. 19, 2015

Related U.S. Application Data

(60) Provisional application No. 61/878,714, filed on Sep. 17, 2013.

(51) Int. Cl.
*G06F 15/16* (2006.01)
*H04N 7/16* (2011.01)
(Continued)

(52) U.S. Cl.
CPC ............ *H04L 67/141* (2013.01); *H04L 63/04* (2013.01); *H04L 63/08* (2013.01); *H04L 63/0823* (2013.01)

(58) Field of Classification Search
CPC ... H04L 29/08072; H04L 29/06; H04L 43/00; H04L 12/2602; H04L 41/22;
(Continued)

(56) References Cited

U.S. PATENT DOCUMENTS

| | | | | |
|---|---|---|---|---|
| 7,764,675 B2 * | 7/2010 | Rooholamini | .......... | H04L 45/00 370/255 |
| 2001/0051980 A1 * | 12/2001 | Raciborski | ........ | G06F 17/30864 709/203 |
| 2006/0277075 A1 * | 12/2006 | Salwan | ............... | G06F 19/3418 705/3 |

(Continued)

*Primary Examiner* — Mahran Abu Roumi
(74) *Attorney, Agent, or Firm* — Norton Rose Fulbright Canada LLP

(57) ABSTRACT

A computer system is provided that enables secure, on demand communications across IT infrastructures that may be divergent, and that may be associated with legacy components, different communication protocols, and frequent system changes. The system includes one or more bridge utilities, each bridge utility comprising two or more anchor components, each anchor component being connected to one or more associated devices or computer systems, the anchor components automatically locating and communicating with one or more span utilities, wherein the anchor components and the span utilities execute functionality for automatically creating and configuring connections between them so as to establish the bridge utility, and wherein the anchor components and span utilities are operable to send and receive signalling communications between them for configuring anchor to anchor connections, including hierarchical connections for implementing hierarchical relationships between the associated devices or computer systems, thereby establishing peer-to-peer anchor associations and parent-to-child anchor associations; and once data connections are established between anchor components in a peer-to-peer anchor association ("peer anchor components"), data communications between peer anchor components carry communications automatically between their associated devices or computer systems on a secure and on demand basis; and wherein the one or more bridge utilities enable secure, on demand communications across the IT infrastructures, even if these are divergent, thereby giving effect to information processes across such IT infrastructures.

18 Claims, 22 Drawing Sheets

(51) Int. Cl.
G06Q 10/00 (2012.01)
H04L 29/08 (2006.01)
H04L 29/06 (2006.01)

(58) Field of Classification Search
CPC .............. H04N 21/4532; H04N 7/163; H04N 21/4542; H04N 21/4755; H04N 21/454; G06Q 50/22; G06Q 50/24; G06Q 40/08; G06Q 10/10; G06F 19/322
USPC .......................................................... 709/224
See application file for complete search history.

(56) References Cited

U.S. PATENT DOCUMENTS

| | | | | |
|---|---|---|---|---|
| 2010/0042449 A1* | 2/2010 | Thomas | ................ | G06Q 10/06 705/35 |
| 2010/0153134 A1* | 6/2010 | Claud, III | ............. | G16H 10/60 705/3 |
| 2011/0054934 A1* | 3/2011 | Vesto | ..................... | G06Q 10/06 705/3 |
| 2012/0101843 A1* | 4/2012 | Mathur | ................ | G06F 19/328 705/2 |
| 2012/0266251 A1* | 10/2012 | Birtwhistle | ......... | G06F 19/3481 726/26 |
| 2012/0331567 A1* | 12/2012 | Shelton | ............... | G06F 21/6245 726/28 |
| 2013/0132107 A1* | 5/2013 | Kohansimeh | .......... | G06Q 50/22 705/2 |
| 2013/0290005 A1* | 10/2013 | Vesto | ..................... | G06Q 50/22 705/2 |
| 2014/0173092 A1* | 6/2014 | Uluderya | ............ | H04L 67/1008 709/224 |
| 2014/0181248 A1* | 6/2014 | Deutsch | ................ | H04L 49/354 709/217 |
| 2014/0275807 A1* | 9/2014 | Redei | ................... | A61B 5/0022 600/300 |
| 2015/0161355 A1* | 6/2015 | Karra | ................... | G06F 19/3475 705/2 |

* cited by examiner

SYSTEM AND METHOD FOR BRIDGING DIVERGENT INFORMATION NETWORKS

CROSS-REFERENCE TO RELATED APPLICATIONS

This application claims the benefit of U.S. Provisional Patent Application No. 61/878,714, filed Sep. 17, 2013, the contents of which are hereby incorporated by reference in its entirety.

FIELD OF THE INVENTION

This invention relates generally to solutions for enabling information processes across divergent information technology and communication infrastructures. This invention relates more particularly to computer systems and information architectures for enabling information processes across divergent information technology and communication infrastructures.

BACKGROUND

Many organizations use complicated information technology and communication infrastructures ("IT infrastructures") that include, for example, data processing, data storage, and communication-related utilities and components. These infrastructures may include a variety of different hardware and software components. These infrastructures may integrate legacy and state-of-the-art components, and a range of utilities and components serving different functions. Deployment and maintenance of these infrastructures can be complicated and costly.

In numerous areas of business or government there is a need to enable information processes across multiple participating organizations (usually referred to in this disclosure as "entities" or "enterprises"), while addressing requirements regarding, for example, privacy and security. With the significant variation between the components of, and configuration of, IT infrastructures of individual organizations, enabling information processes across a plurality of organizations can be complicated and costly to deploy and maintain. Also, changes to components, utilities, or workflows related to information processes can be very common. These changes can be costly and complicated to implement. Also, many information processes are essential to the entities and therefore implementing changes may require costly workaround systems or processes in order to avoid interruption of availability. In some environments, these workaround systems or processes are not available or are not financially feasible which may result in service interruptions.

Health care is an example of a domain where continuously evolving information systems that are used to publish, store and retrieve data generated, for example, by medical devices and clinical staff. In an effort to increase collaboration and improve patient care, healthcare enterprises are moving towards establishing Health Information Exchanges ("HIEs") that generally consist of information and communication networks that connect two or more institutions, allowing them to share data. Deployment and management of information systems in HIEs (and network applications in general) can raise significant technology and resource issues in order to address, for example, security requirements, and interoperability.

Not only is there a need to implement information processes across different entities with divergent IT infrastructures, but there is also a need for improving service by, for example, optimizing traffic and applying data analytics across these divergent IT infrastructures. These requirements are generally not met using prior art solutions.

There is a need for computer systems, computer system architectures, and computer implemented information processing methods that address the previously stated requirements.

SUMMARY

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In one aspect of the invention, a computer network implemented system is provided comprising: one or more computers, the one or more computers implementing one or more bridge utilities for enabling the exchange of information across divergent information and communication infrastructures ("IT infrastructures"), where the IT infrastructures may be associated with different entities, each bridge utility comprising two or more anchor components, each anchor component being connected to one or more associated devices or computer systems, the anchor components automatically locating and communicating with one or more span utilities, wherein the anchor components and the span utilities including programming for automatically creating and configuring connections between them so as to establish the bridge utility, and wherein the anchor components and span utilities are operable to send and receive signalling communications between them for configuring anchor to anchor connections, including hierarchical connections for implementing hierarchical relationships between the associated devices or computer systems, thereby establishing peer-to-peer anchor associations and parent-to-child anchor associations; and once data connections are established between anchor components in a peer-to-peer anchor association ("peer anchor components"), data communications between peer anchor components carry communications automatically between their associated devices or computer systems on a secure and on demand basis; and wherein the one or more bridge utilities enable secure, on demand communications across the IT infrastructures, even if these are divergent, thereby giving effect to information processes across such IT infrastructures.

In another aspect, the system is based on a decentralized information architecture.

In another aspect, the system includes one or more server computers that provide central management of the connections between anchor components and span utilities.

In another aspect, at least one of the anchor components is connected to the one or more associated devices or computer systems through an enterprise firewall.

In another aspect, the IT infrastructures span a plurality of data networks.

In another aspect, the plurality of data networks comprises a Health Information Exchange network.

In another aspect, at least one of the anchor components and span utilities includes a remote management/configuration component.

In another aspect, at least one of the anchor components implements a Quality of Service layer allowing optimization of data flow between the associated devices or computer systems.

In another aspect, the data communication between peer anchor components carry communications between their associated devices or computer systems according to at least one of DICOM, HL7, SOAP, RESTful and ebXML protocols.

In another aspect, at least one of the anchor components is configured to perform data translation or data mapping on communications between the associated devices or computer systems.

In another aspect, at least one of the anchor components maintains a local registry of the associated devices or computer systems.

In another aspect, at least one anchor component is configured to transmit at least a part of its local registry to at least one other of the anchor components or at least one of the span utilities.

In another aspect, the bridge utility includes a central registry of the devices or computer systems associated with each of the anchor components.

In another aspect, at least one of the anchor components is configured to authenticate itself to at least one other of the anchor components or at least one of the span utilities.

In another aspect, the at least one of the anchor components is configured to authenticate itself using at least one cryptographic key.

In another aspect, the data connections established between the anchor components are encrypted.

In another aspect, the one or more computers comprise at least one mobile device or embedded device.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
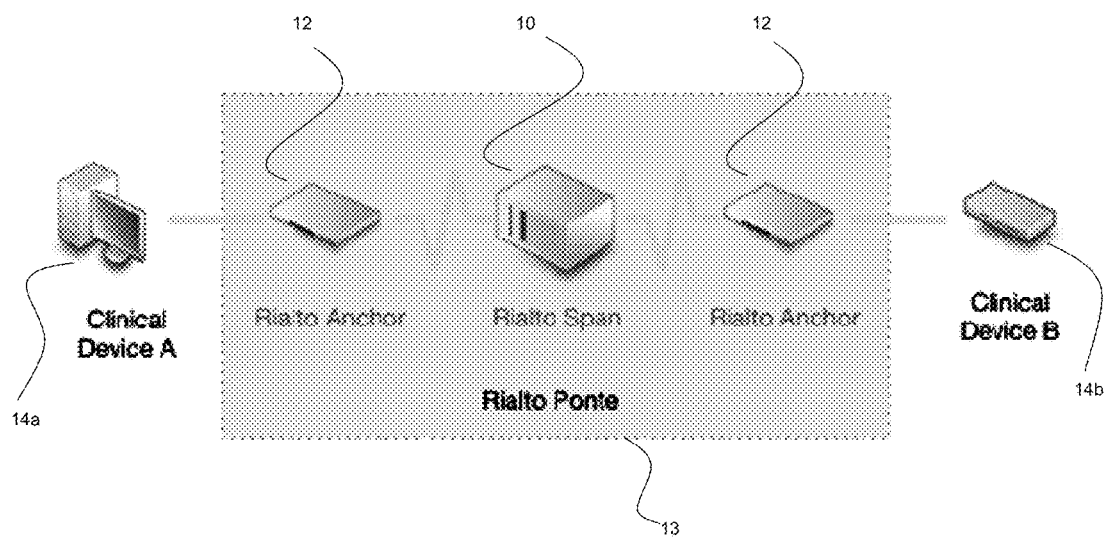
FIG. 1 is a system diagram illustrating the components of a bridge utility, exemplary of an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Embodiments of the present invention provides a secure, cross-entity communication and communication management platform (the "platform") that enable the exchange of information across divergent IT infrastructures on a secure basis, and on an on-demand basis. The platform places a computer network overlay on two or more existing computer systems and/or data networks linked to at least two IT infrastructures that are divergent.

The platform includes or is implemented using a communication infrastructure provided using one or more network applications and one or more associated applications, that together enable the creation and management of the communication network overlay that bridges two or more divergent communication and data infrastructures ("existing infrastructures") so as to enable network communications between a variety of systems or devices, across a plurality of divergent IT infrastructures, on a secure basis.

In one aspect of the present invention, as shown in FIG. 1, a novel system architecture is described that includes at least one span utility (10) (also referred to as "spans") and then two or more anchor utilities (12) (also referred to as "anchors"). Each anchor utility (12) is linked to at least one device. In FIG. 1, Clinical Device A (14a) is linked to an anchor utility (12), and Clinical Device B (14b) is also linked to an anchor utility (12).

At least one span utility (10) and two or more anchor utilities (12) provide a bridge utility (13), in accordance with embodiments of the present invention. One or more bridge utilities (13) together provide a network overlay that supports information processes between any type of client device, and in a way that supports various hierarchical relationships that may be embodied in information processes between client devices, and across divergent IT infrastructures.

Figure 2:
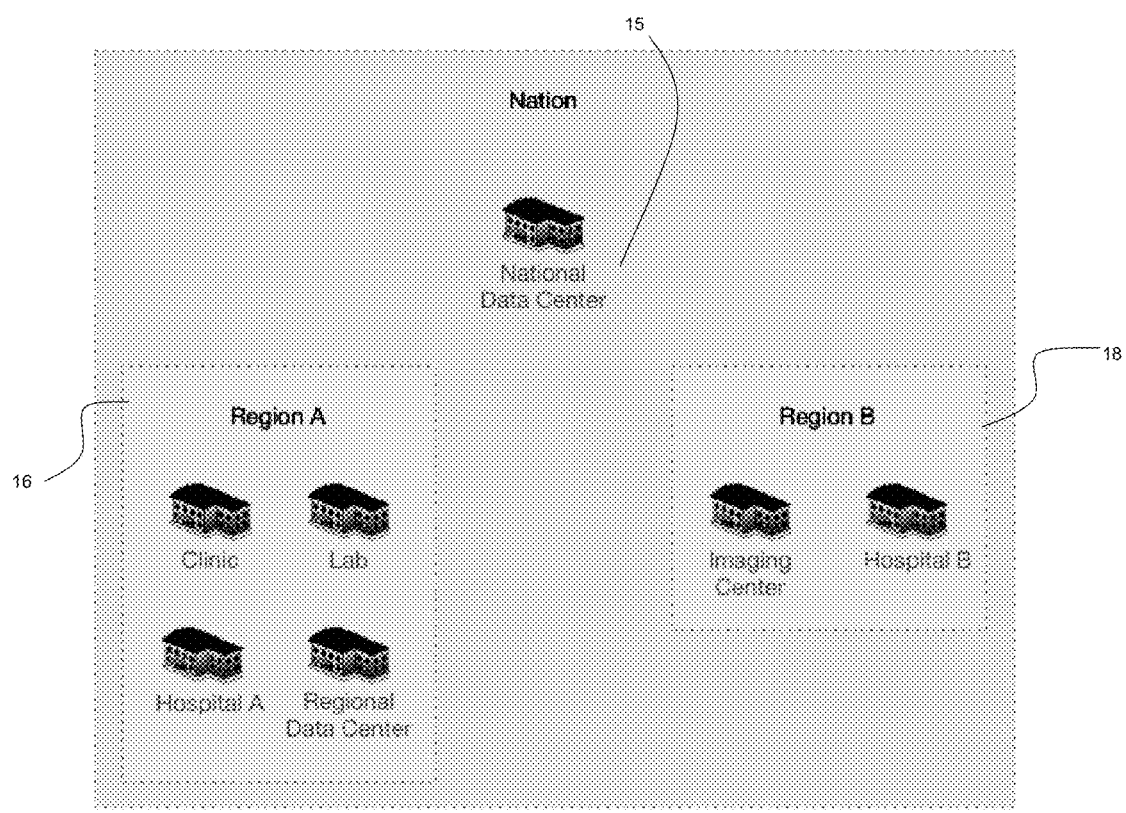
FIG. 2 is a system diagram illustrating a data infrastructure, based on prior art solutions.

The anchor utility (12) is designed to be implemented inside an IT infrastructure, for example, within a firewall associated with a system or data environment. For example, as shown in FIG. 2, a data infrastructure may include a National Data Center (15), and also two associated IT infrastructures, namely Region A (16) and Region B (18). Each of Region A and Region B may include divergent components, utilities, or processes. For example, Region A may implement a legacy system (not shown) that would normally information processes based on data from such legacy system across for example Region A to Region B. Similarly, in order to use data from such a legacy system, additional system and integration burden may be placed on the infrastructure required to implement the National Data Center (15).

Each anchor utility (12) includes programming to automatically locate and communicate with one or more span utilities (10), depending on the configuration parameters received by the anchor utility (12), based on the unique and innovative communication protocol disclosed herein. In another aspect, each anchor (12) is aware of its parent span (10). Each anchor (12) automatically locates and communicates with other spans (10) for signaling and peer anchors for data communication.

Figure 3:
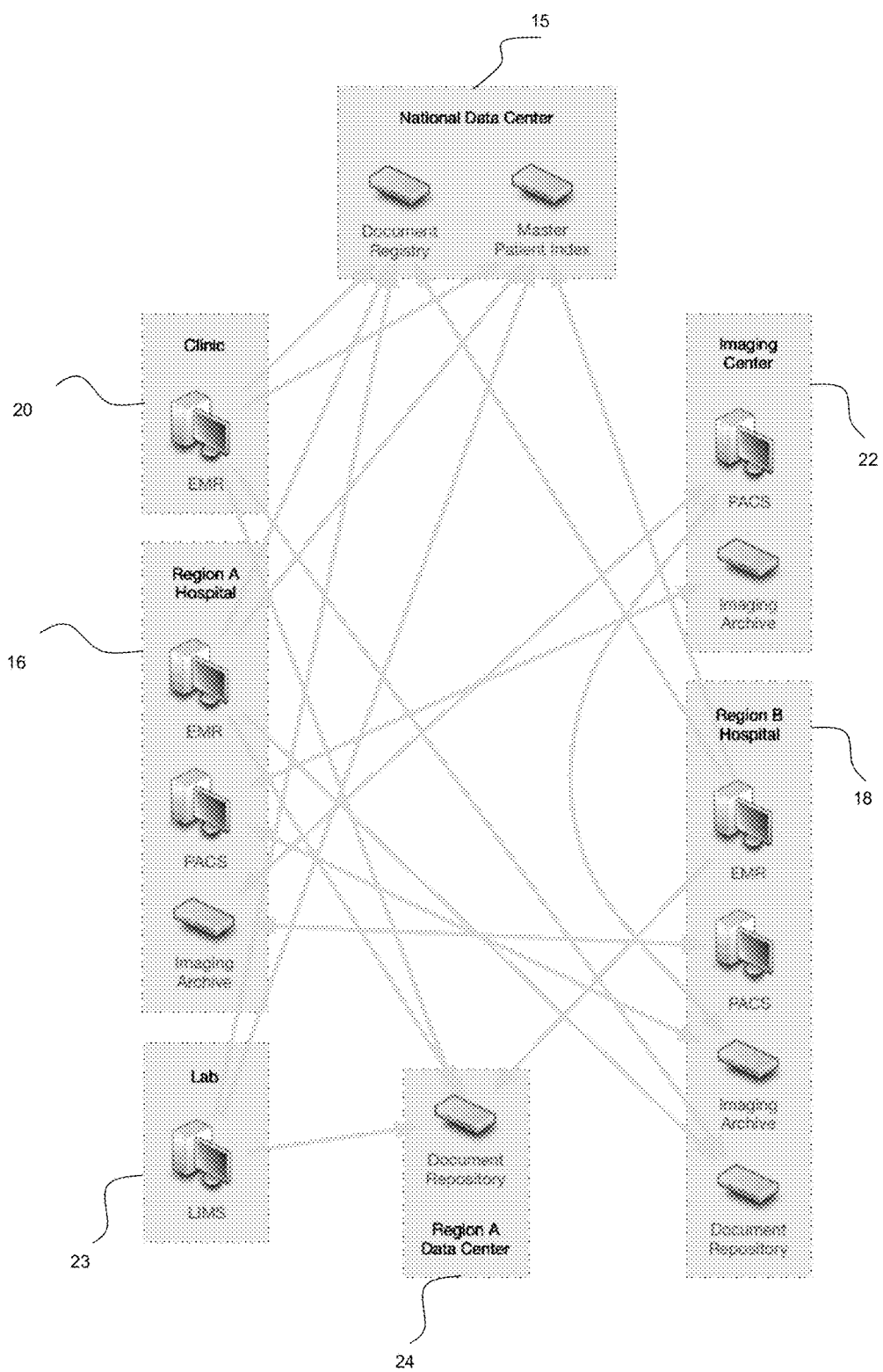
FIG. 3 is a further system diagram illustrating a more complex data infrastructure, based on prior art solutions.

As shown in FIG. 3, for example, in a health care setting, information processes across a range of different entities may be required, and each entity may be associated with a divergent IT infrastructure. FIG. 3 shows a system of divergent IT infrastructures, including a National Data Center (15), Region A (16), which in this example is a hospital, Region B (18), which in this example is another hospital, and also optionally a clinic (20), an imaging center (22), a lab (23), and an off-site document data center (24), which in this example is linked to Region A (16). Each of these entities may include an IT infrastructure with a variety of different components as shown in FIG. 3 such as an Electronic Medical Record (EMR) system, Picture Archiving and Communication System (PACS), Laboratory Information Management System (LIMS), Vendor Neutral Archive (VNA) and so on. FIG. 3 shows examples of the various communication links that may be required between these various systems, to support required information processes. Allowing data flow across these links, with various security barriers, data format issues, data transport issues, and so on, is very complicated. Maintaining such data flows, despite changes to various components, utilities or processes relevant to one or more of the diverse IT infrastructure can be complex and costly, as previously stated. Furthermore, the parameters (including hierarchical parameters) of the various links may vary from time to time. For example, Region A (16) may initially store certain information in Region A Data Center (24), however, a change in process may require this information to also be made available to National Data Center (15). Managing these changes and ensuring that they are implemented correctly can represent a significant resource burden.

Figure 4:
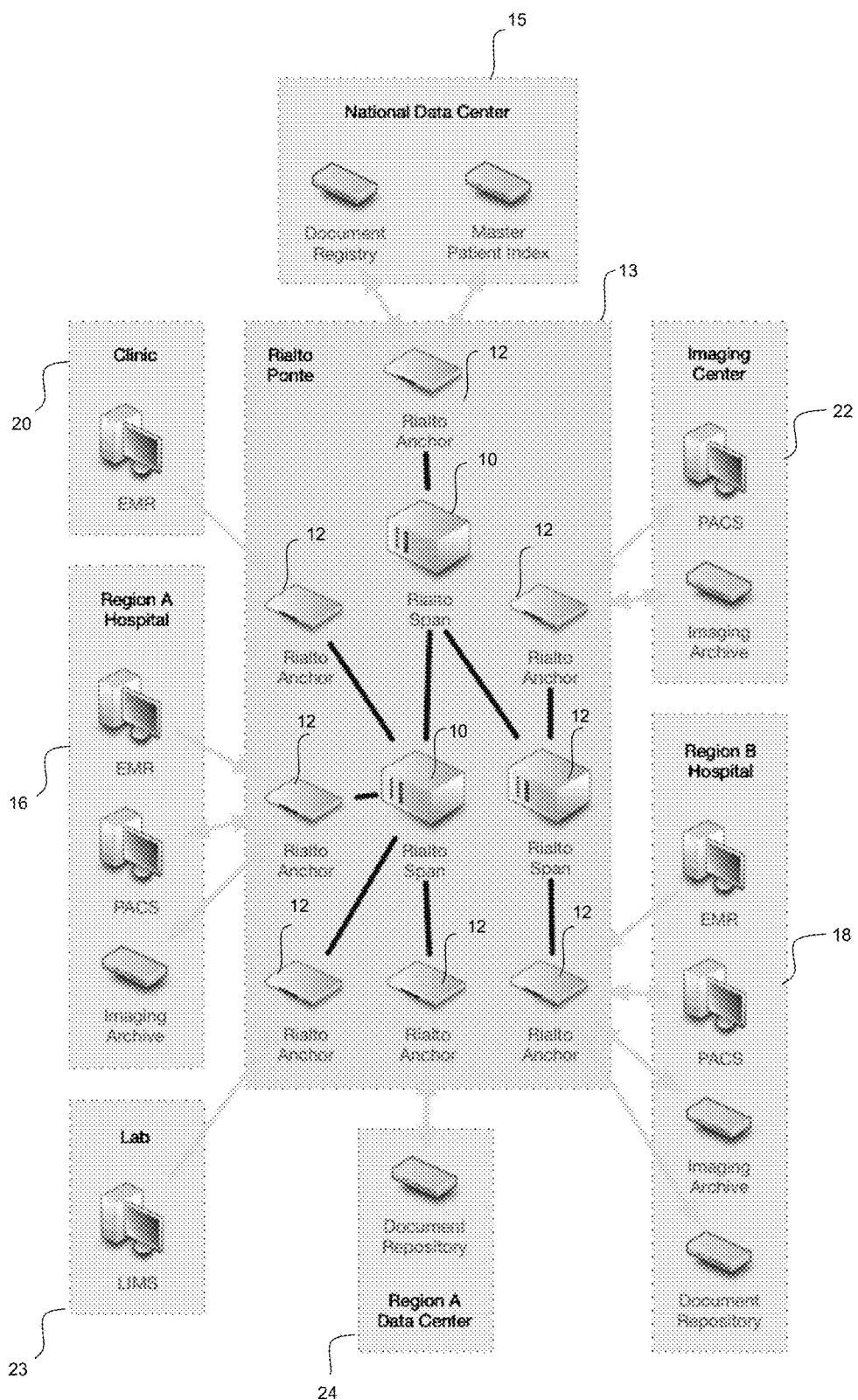
FIG. 4 is a further system diagram illustrating a complex data infrastructure, implementing the system, exemplary of an embodiment of the present invention, and showing the bridge utility, which in this embodiment includes a plurality of span utilities and associated anchor components.

FIG. 4 shows an example of deployment of the present invention, in accordance with an embodiment, where the bridge utility (13) (FIG. 1) provides connectivity, and communication management, so as to enable seamless information processes between the various entities. FIG. 4 also shows that the bridge utility (13) may consist of multiple span utilities (10) assigned to anchor utilities (12). The various spans (10) and anchors (12) in aggregate define a bridge (13) that connects the divergent information infrastructures depicted in FIG. 4. The bridge utility (13) creates and maintains a persistent, secure network overlay for enabling information processes across the various entities, despite the divergent IT infrastructures.

Figure 5:
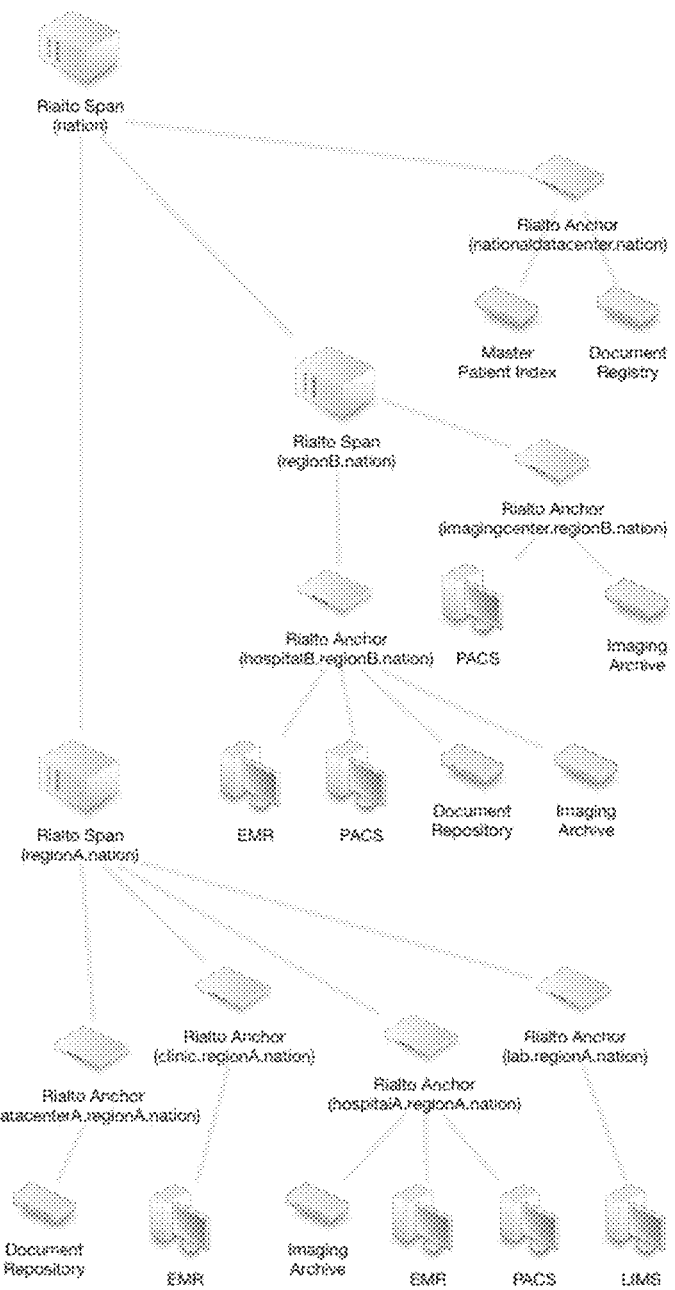
FIG. 5 is a further diagram illustrating possible hierarchical relationships between system components, namely certain span components having management capabilities over their associated span/anchor components, exemplary of embodiments of the present invention.
Figure 6A:
FIGS. 6a, 6b, 6c, 6d, 6e, 6f, 6g, 6h, and 6i illustrate different possible configurations of anchor/span components, exemplary of embodiments of the present invention, and the system processes involved in setting up data connections between them.
Figure 6B:
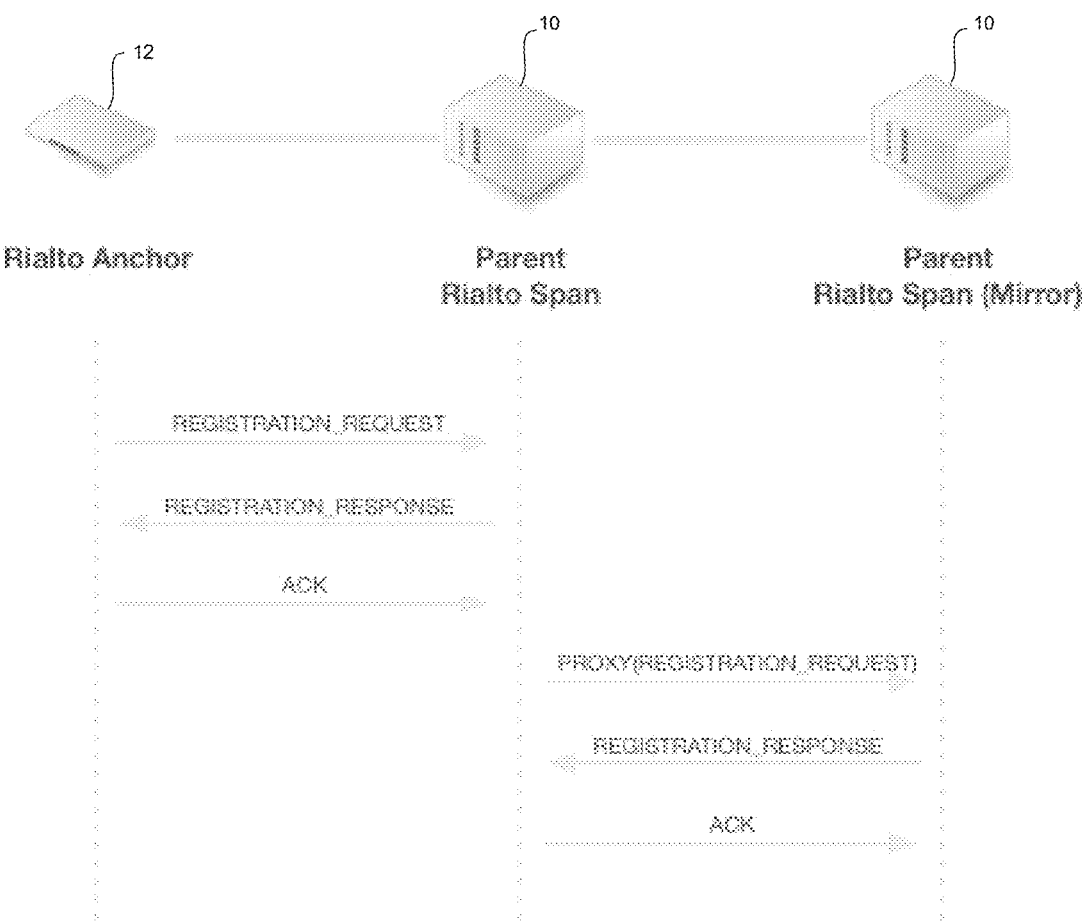
Figure 6C:
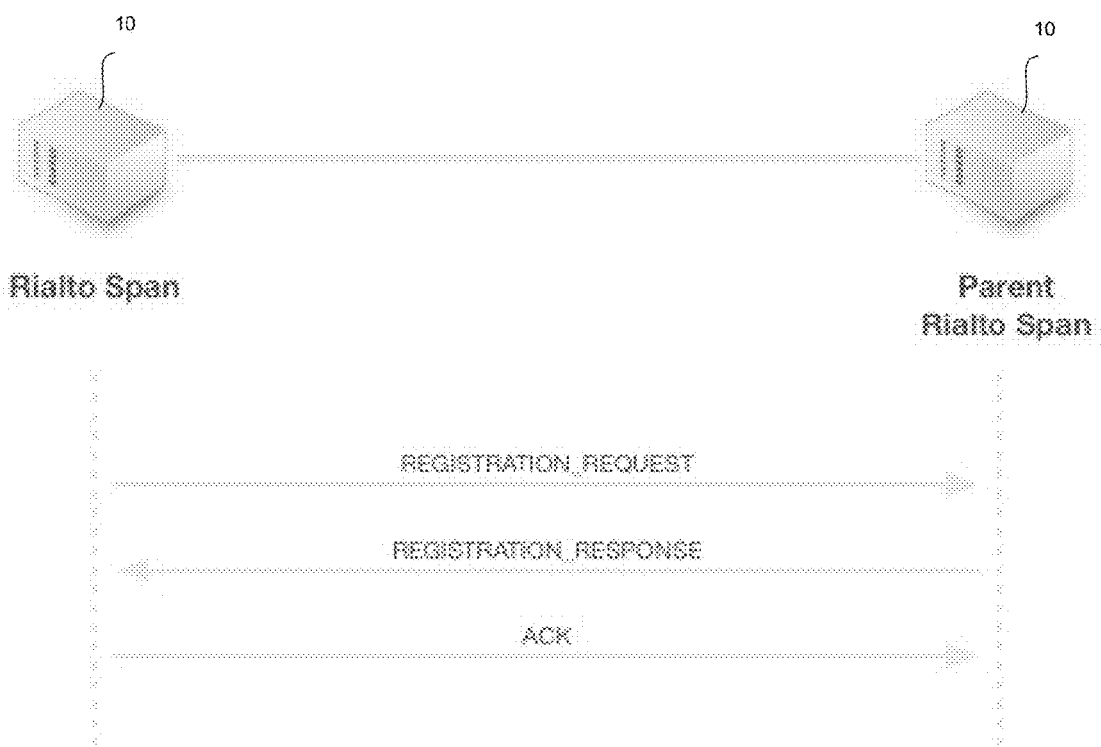
Figure 6D:
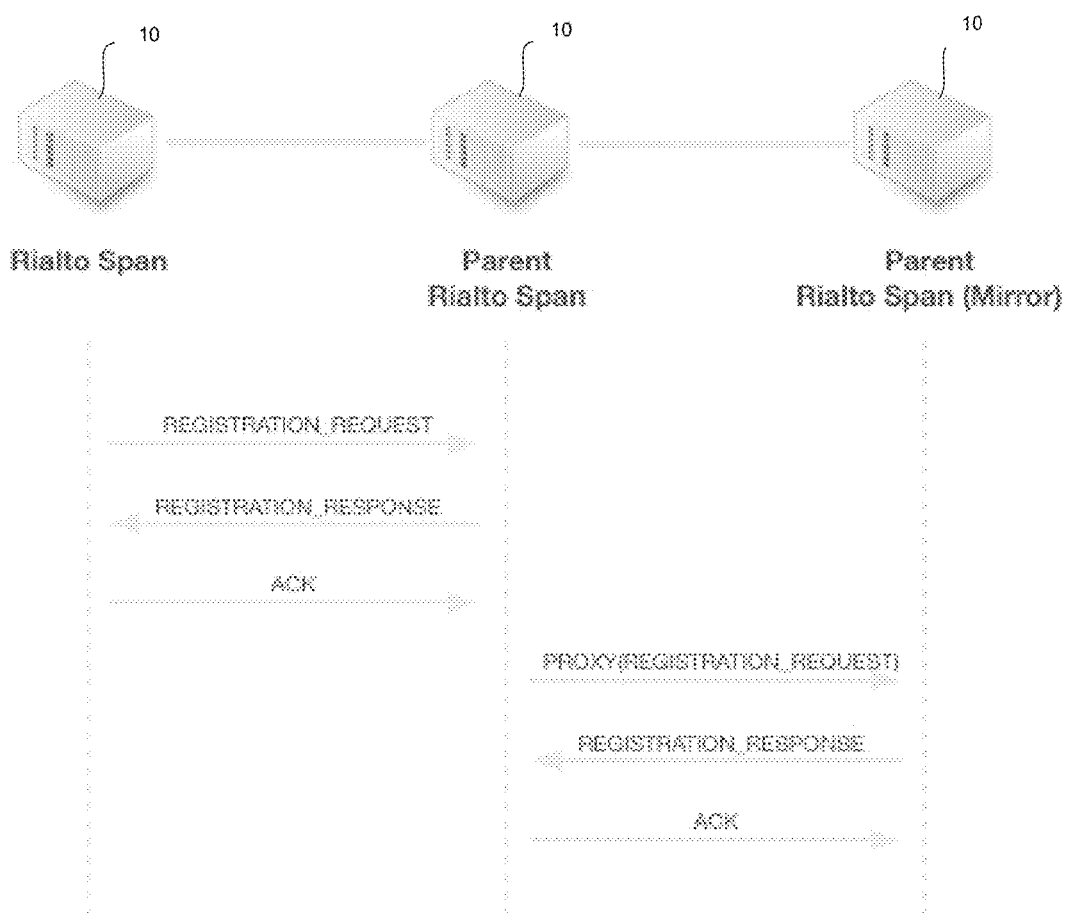
Figure 6E:
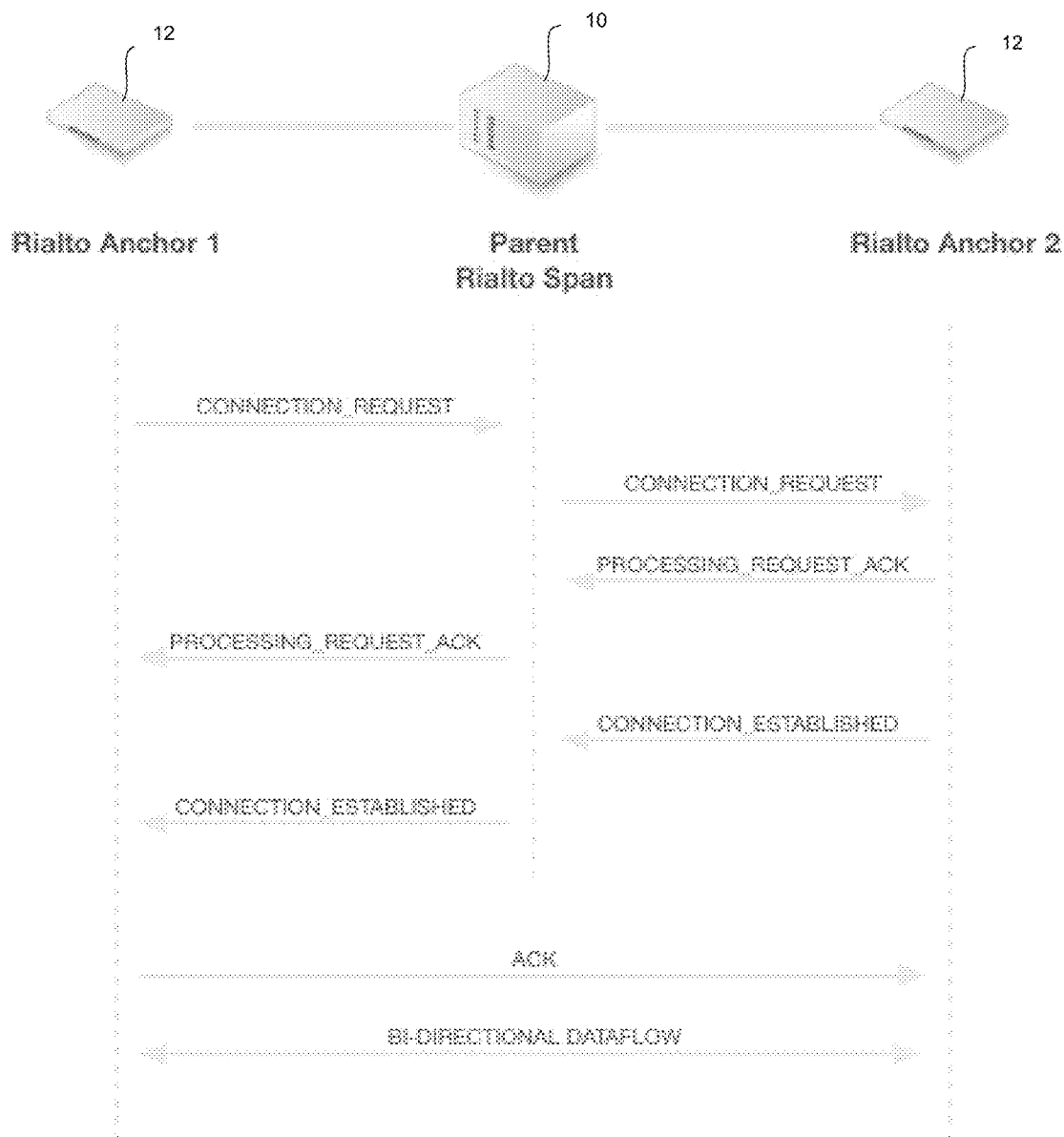
Figure 6F:
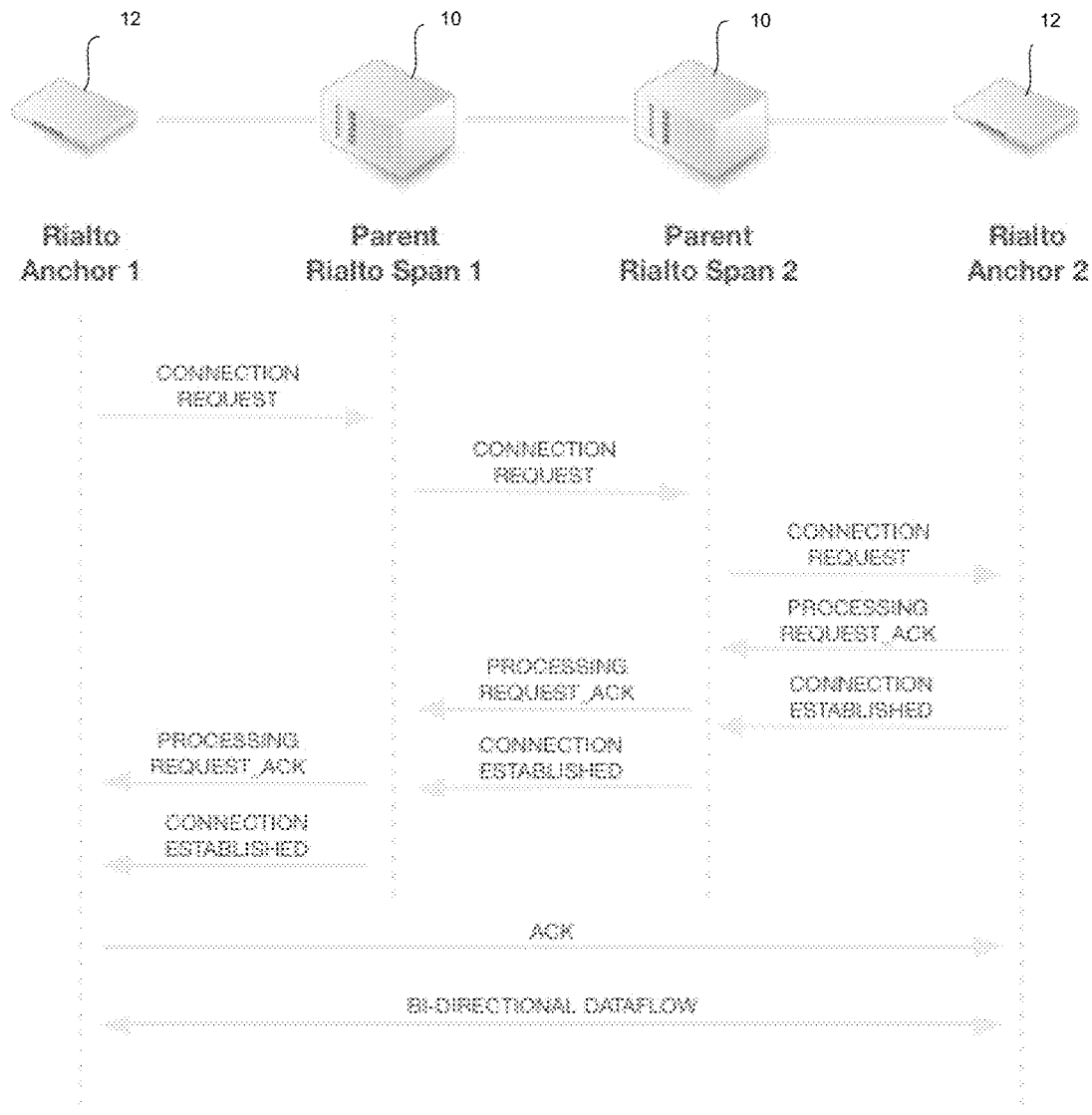
Figure 6G:
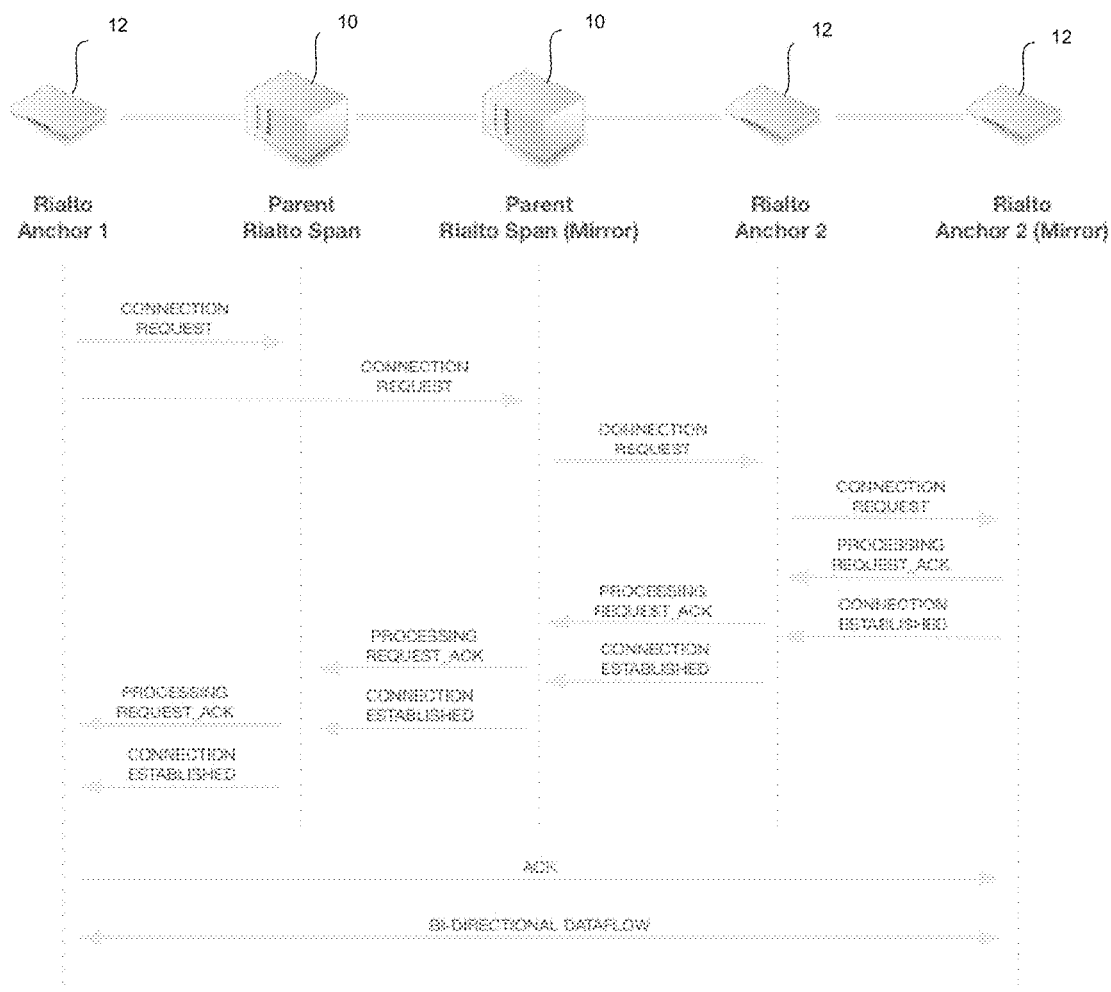
Figure 6H:
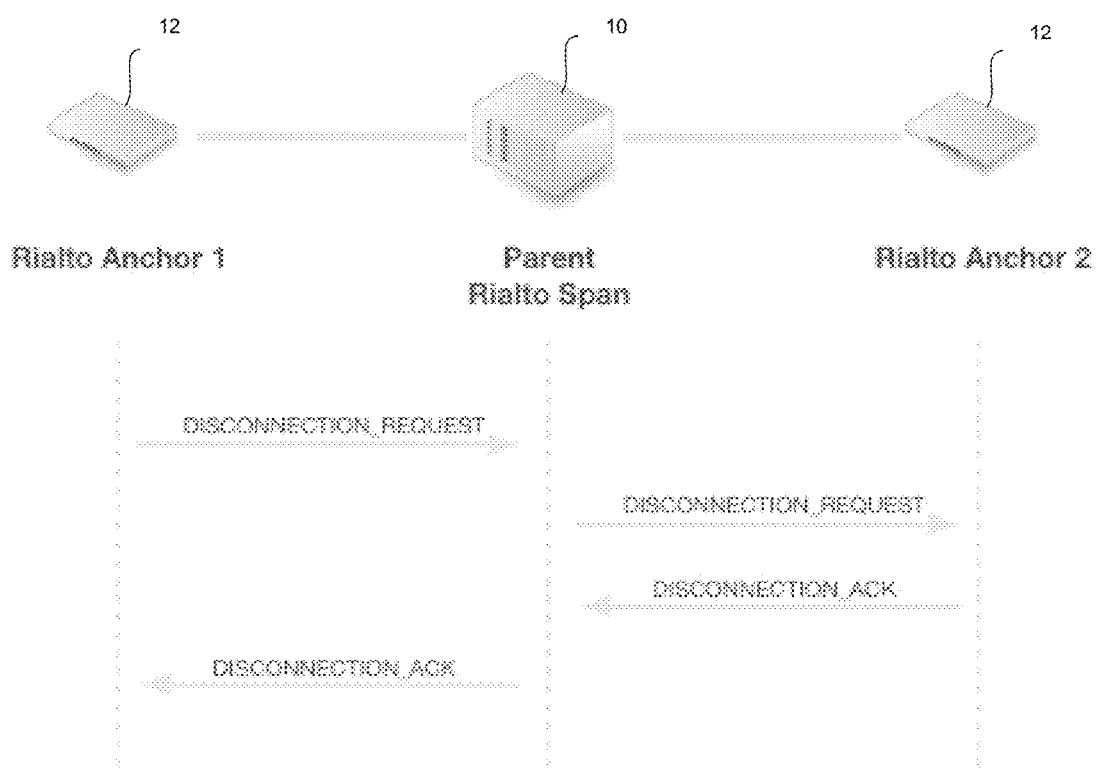
Figure 6I:
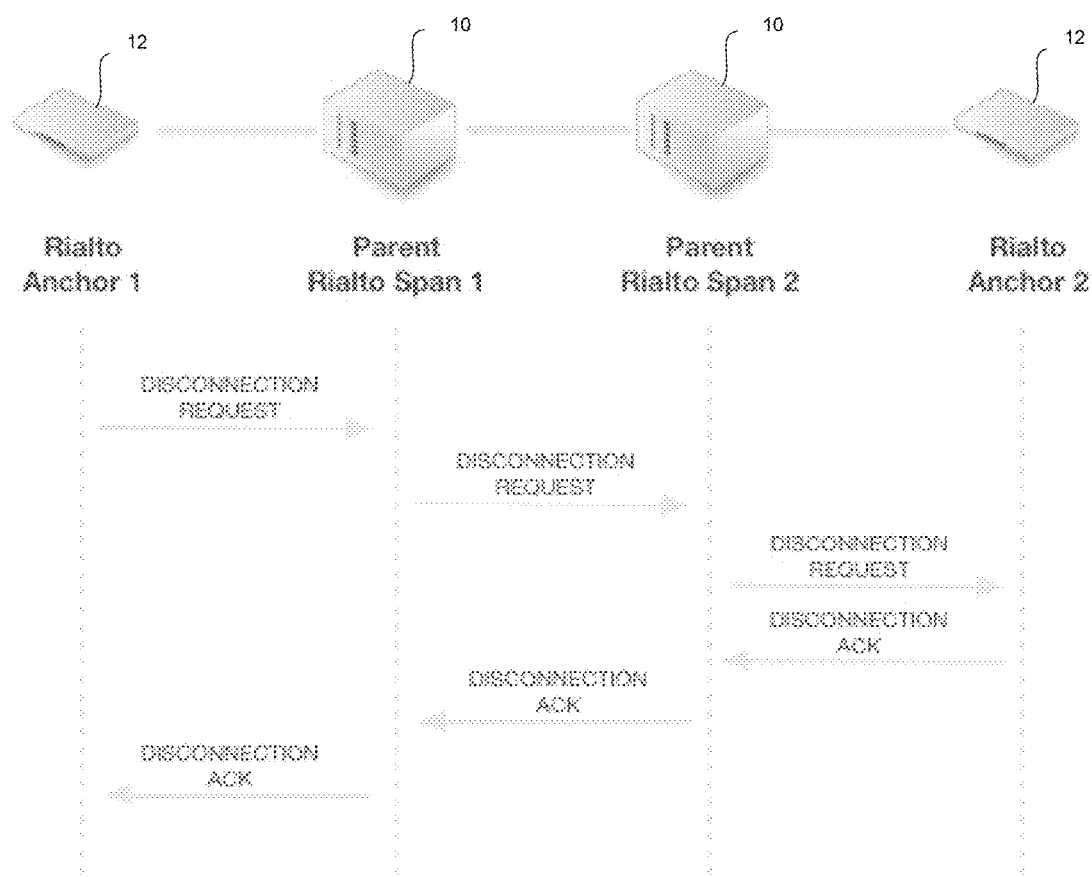

In FIG. 5, the links between the different entities may be links of any type of network capable of carrying data, such as, the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, LTE, 3G/4G, Bluetooth), SS7 signaling network, fixed line, local area network, wide area network, and others, including any combination of these. The links may span a plurality of such networks.

For reasons further explained below, various changes may be made to participating IT infrastructures and yet the bridge utility (13) continues to provide managed connectivity.

One aspect of the platform is that it supports both centralized and decentralized information architectures. This is an important aspect of the present invention, as implementation of information processes across divergent IT infrastructures often requires multi-level, hierarchical systems and data processes. Accordingly the anchors (12) and spans (10) are configured to operate both on a peer-to-peer basis (by including for example a control component that implements peer-to-peer functionality by receiving and updating programming based on control messaging received from other peers, and propagating updated programming across associated peers). The anchors (12) and spans (10) are also responsive to control programming that defines hierarchical relationships between groups of components, including as it relates to a central server that may be given specific central management tasks. Many environments that span different IT infrastructures require a mixture of peer-to-peer and one or more central managers, sometimes for specific functions or specific data. Configuration of such hybrid environments, incorporating both centralized and decentralized management is particularly complicated using prior art solutions, yet seamless using the components and architecture of the present invention. The anchors (12) and spans (10) enable a hierarchical communication network overlay that is easy to configure (and re-configure if there are changes) to implement the various hierarchies that result from the large number and complex relationships that may be required to implement the desired information processes and device associations.

It is also noted that prior art solutions generally require a centralized architecture to provide managed communications across different IT infrastructures. The requirement of a central management architecture can be prohibitive for certain information processes because of extra overhead. An important advantage of the present invention is that it permits design flexibility including the use of a decentralized communication management architecture, where this is desired or required.

While the disclosure discusses primarily application of the system and architecture in a health care information environment, it should be understood that the invention is not limited to any particular application of the technology. The system and architecture described may also be used to enable the connection of multiple resource consumption monitoring devices and/or consuming devices; for use in smart grid applications; connection to a network of a plurality of wearable health monitoring devices, and enabling the management of such health monitoring devices from one or more computers.

The system and architecture described herein may also be applied to one or more home or office environments to enable the connection and cooperation of various network-aware appliances and computing resources. Such appliances and resources may use otherwise incompatible communication protocols or data formats (e.g., for handshaking, peer discovery, and data exchange). The system and architecture described herein may enable remote monitoring and management of these appliances and resources.

In a health application of the technology, each existing infrastructure may be an existing HIE or another data network. The present invention provides a cost effective method and system for enabling the flow of data, and use of data, across two or more HIEs, with significant reductions in integration, implementation, support and maintenance costs.

Bridge Utility

The bridge utility (13) or component is operable to form the hierarchical overlay network over two or more existing data and/or communication infrastructures, and thereby act as conduit for network communications between at least one device associated with a first data and/or communication infrastructure, and at least one other device B associated with a second data and/or communication infrastructure.

The bridge utility (13) is best understood as a proxy server, however, with a unique and non-obvious configuration. In an embodiment, the bridge utility (13) includes both (1) an external interface that enables communication with device A and device B, and (2) an internal interface for communication with both (a) two or more anchor components, and (b) a span component that links any two or more anchor components. In a representative set up of the bridge utility (13), it includes two anchors that act as endpoints of the bridge, and between the two anchors there are one or more span components. Because data communication is configured to flow on a peer-to-peer basis across anchor/span combinations, data flows directly between any groups of associated spans. If a configuration requires, traffic may be rerouted between two anchors (12) for example to an intermediate anchor (12) or a different anchor (12). Rerouting may be implemented for example to optimize network communications for example by reducing round-trip times by making use of higher bandwidth available, or unused bandwidth, through intermediate anchors (12). This illustrates that the hierarchical network overlay established by the bridge utility (13) is a managed network overlay, and the control programming may incorporate various strategies to streamline network communications and optimize network performance by using a variety of known network management techniques. All of these can be seamlessly and selectively implemented across the various components of a bridge utility (13).

In one aspect, application (device) data flows directly between peer anchors (12), but the signaling, device discovery and other bridge maintenance communications flow between anchor/span combinations via groups of associated spans. In one aspect, communication related to device discovery, traffic monitoring, and other maintenance operations may be referred to as "bridge maintenance operations").

In a further aspect of the invention, the anchor (12) and span (10) components include programming for engaging in two types of communications, which are used to dynamically set up and terminate the various data connections between them: (A) data communications and (B) signaling communication. Data communications occur between anchors, namely endpoint anchors, or possibly intermediate anchors for traffic routing purposes, as previously explained. Data communications carry the traffic between the various IT infrastructures, with the bridge utility acting as the intermediary to deliver communications as required, and despite differences in data format etc., as described below.

Signaling communications are used to establish data connections between anchors (12). In one implementation, a signaling connection is set up using one or more spans (10), but usually based on a request from an anchor (which may be referred to as the "source anchor"). The request to set up a data connection with another anchor (associated for example with a remote anchor that is linked for example to a device in a different IT infrastructure—and may be referred to as a "destination anchor") may be based on a request from a system or device associated with the source anchor. At each stage of setting up the signaling connection, each intermediate system (which may be an anchor or a span) enforces its own access control policy. When the signaling connection is setup, the source anchor requests access to a system or device that resides in the private network/infrastructure served by the destination anchor. After enforcing appropriate authentication and access control, the destination anchor provides the source anchor with a service ticket or equivalent. The service ticket in one implementation is a cryptographically signed message that contains, amongst other parameters, the unique identifier (UID) of the destination device, the public network address (hostname/IP) of the destination Anchor, the UID of the source anchor, and a timestamp indicating the validity of the service ticket. Note that the same signaling connection may be re-used to request new service ticket(s) for the same or a different destination device.

Further details are provided below under the heading "communication protocol".

Once a signaling connection has been established, the source anchor may request the setup of a data connection between the two endpoint anchors.

In another possible implementation aspect, each anchor (12) may include two open public communication ports. A first open public port may be used for signaling as described above, and the other open public port accepts data connections. In another possible aspect of implementation, anchor port numbers are standardized across the bridge utility (13), but may be reconfigured to work around port mapping conflicts. In another possible embodiment, a single port may be used for signaling and data communication, by multiplexing between signaling and data communication based on for example the preamble or header of the communication.

In another aspect of implementation, a source anchor (12) directly contacts the destination anchor (10) using its standard port and provides it with the service ticket obtained earlier. Each anchor (12) may include a connection management module as shown in FIG. 9b. The connection management module may operate as an authentication module, relying on resources of the certificate authority module also shown in FIG. 9b. The access control module is then used to authenticate the source anchor, thereafter access control is activated and the service ticket may be validated, and if so a data connection is opened to the destination system or device, which then allows data to flow freely between the source and destination devices, with the bridge utility (13) there between acting an intermediary.

A suitable communication protocol may be used to move data between the endpoint anchors (12) (and any intermediate anchors). In one possible implementation, the communication protocol allows for data compression (different types of data use different types of compression), pre-fetching and/or caching as well as transformation/mapping to/from the same/different application layer protocol versions implemented by endpoint systems or devices.

In one possible implementation, the communication protocol is a data exchange protocol that includes common features across different types of endpoint systems or devices (such as support for exchange of service tickets) but may also differ depending on the type(s) of endpoint devices.

The system and architecture provided, in one aspect, enables the distribution of required programming, including updates to components for executing different communication protocol features, based on requirements of participating endpoint systems or devices.

In one possible implementation, the ability to ensure that there are common features across architecture components, and distribution of updates (including additional programming to support communication protocol updates because of different types of data etc. required by relevant endpoint systems or devices) may be provided by integrating in the anchors (12) a plug-in architecture for device adapters. The use of this plug-in architecture also allows anchor capabilities to be extended as necessary when new protocols come into use.

The span component and anchor components incorporate addressing technology that enables connections between the divergent IT infrastructures to be created and removed dynamically. This enables embodiments of the present invention to respond to changes in the data and/or communication infrastructures (such as adding new server components, new devices, changes in protocols, changes in data workflows and so on), without the need for costly and time consuming modifications or reconfigurations that are generally required by prior art solutions.

In another aspect, each span component is configured to be operable to function either as a root of a bridge connection, as described, or an intermediate span as a child of an existing span. Each anchor and span is addressable from an authorized server component, the server component being linked with a connection management layer that enables the creation and management of data connection configurations. Furthermore, this authorized server component is a server component that is implemented to any anchor or span. The functionality described above in effect implements to each anchor or span a server component, which is treated by any other anchor (12) or span (10) as an authorized server component. Each anchor (12) and span (10) in effect is configured to act as a network appliance and in one implementation each such component includes a web-based, administration GUI (21) that is accessible using a browser, but only by system administrators, in the private network that is implemented by the bridge utility (13). In one configuration therefore, this means that the admin GUI (21) cannot be accessed remotely, which inherently ensures that data traffic flows securely within the network environment of a bridge utility (13), assuming that appropriate access control is enforced.

Figure 8A:
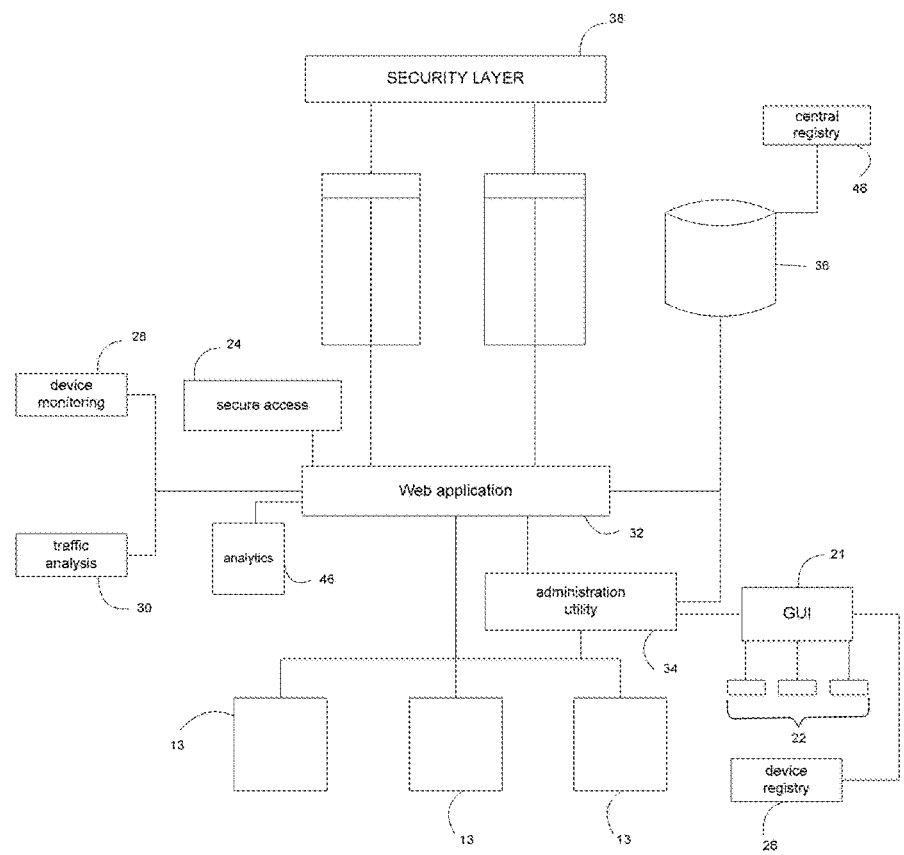
FIG. 8a is a further system diagram illustrating a possible implementation of the platform of the present invention, exemplary of an embodiment of the present invention.

The information architecture may include a secure access utility provided for example by the security layer (38) shown in FIG. 8a that may allow authorized users to remotely access the admin GUI (21) and for example set up and manage anchors/spans. In one possible implementation, one or more command-line tools may be provided that allow remote configuration/management of anchor/span components. Remote configuration/management of anchor/span components may also be provided, for example, by way of custom remote configuration/management protocols implemented on top of, and leveraging, the other data communication and signaling protocols used by those components disclosed herein. In such cases, remote configuration/management functionality may be exposed, e.g., through one or more Application Programming Interfaces (APIs), such that use of the admin GUI (21) and/or the command-line tools may be avoided. The aforementioned custom protocols may, for example, be implemented as plug-in extensions to the anchor/span components that may be inserted and activated as required, based on the particular implementation and operational requirements.

Various network appliance configuration protocols may be used such as Simple Network Management Protocol (SNMP).

The architecture described therefore enables the dynamic construction and/or removal of peer-to-peer connections between devices and other components linked to the divergent data and/or communication infrastructures. This in turn enables data flows between these devices and other components without the need for expensive and costly integration and data infrastructure management required based on prior art solutions.

In one possible implementation, only an anchor's admin GUI (21) may be used to setup and terminate anchor connections. This follows a possible de-centralized model for using the architecture provided.

In one possible implementation, connection setup may be facilitated by the use of a ticket or other code that may be shared between anchors. The ticket may encode or otherwise indicate connection parameters in a conveniently shareable form. For example, the ticket may comprise a text string. For example, during setup of a connection between a source anchor and a destination anchor, the admin GUI (21) at the destination anchor may be configured to provide an administrator of the destination anchor with a ticket to be shared with an administrator of the source anchor. The administrator of the source anchor may then submit the ticket to the admin GUI (21) at the source anchor to automatically configure the desired connection, e.g., based on the parameters encoded in the ticket. In one example case, the ticket may be e-mailed or otherwise communicated to the administrator of the source anchor, who can then copy and paste the ticket into an input form provided by the admin GUI (21) at the source anchor. In other cases, the ticket may be generated at the source anchor and provided to the destination anchor.

In another possible implementation a span (10) or some other application may also be used to configure child anchor and span components so as to use centralized aspects.

This allows the configuration of a system along the lines of what is shown in FIG. 5, where certain span components may be provided with management capabilities over their associated span/anchor components.

It should also be noted that although all signaling and data connections are established dynamically on an on-demand basis, in one possible implementation, there may be two classes of inter-anchor connection configurations: static and transient. Systems administrators create static connection configurations via the anchor admin GUI (21), while transient configurations are created by device adapters (22) when an endpoint device (i.e., local to the source anchor (12)) requests connectivity to a remote device. Both types of connection configurations may use a device registry (26) detailed below. As their names suggest, transient configurations are lost when the devices complete their transactions, while static configurations are persisted by the anchors (12) for future use. These aspects allow the maintenance of relationships between anchors/spans that embody dependencies between associated systems/devices, based on information processing requirements.

Significantly, the number of configuration dependencies may be reduced significantly, which in turn may reduce the complexity of deployment of the connections described. Specifically, each device described needs only to know how to address its associated anchor component. The system and architecture enable a proprietary, simplified set-up process for deploying the bridge components of embodiments of the present invention.

In a particular implementation of the present invention the one or more endpoint (local) devices and the associated remote devices are best understood as "peer devices".

In another possible aspect of implementation, the system may also include a novel system or device monitoring utility (28) (may also be referred to as "monitoring utility"), and a traffic analysis utility (30). The monitoring utility (28) is operable to act as an analytics layer that can monitor the operation of any linked components. The traffic analysis utility (30) is linked to the discovery utility (28) so as to derive information regarding data flow across the linked components (i.e., between systems or devices that are served by their respective anchors and communicate with one another using the system of the present invention), including data flow performance and other Quality of Service (QoS) parameters. The system and architecture also includes a QoS layer so as to enable the optimization of data flow across the components of the system, including for example by means of rerouting, traffic shaping, and other known QoS techniques.

The present invention may also incorporate various security infrastructure features, including identity management, communication security, and access control.

Further Implementation Details

As previously described, the two anchors (12) and two or more spans (10), dynamically configure data connections. FIGS. 6a, 6b, 6c, 6d, 6e, 6f, 6g, 6h, and 6i illustrate different possible configurations of anchor/span components, and the system processes involved in setting up data connections between them.

As previously described, the system and architecture of the present invention provides significant flexibility, including by accommodating—including within a single bridge utility (13)—different management architectures, while relying on the anchor/span components, with the connections between them, and importantly only with the need that participating systems/devices be connected to their anchor (12) endpoint. Between the endpoints various management architectures may be set up, terminated and different management architectures may be set up, and all of these may be changed to include new systems/devices, and in fact new IT infrastructures all together, simply by for example adding new anchors (12) and associated systems/devices. The system and architecture devised by the inventors significantly reduces the time and infrastructure requirements for setting up communications across such IT infrastructures, and also to manage these (keep them up to date, add new systems/devices, etc.).

Figure 7A:
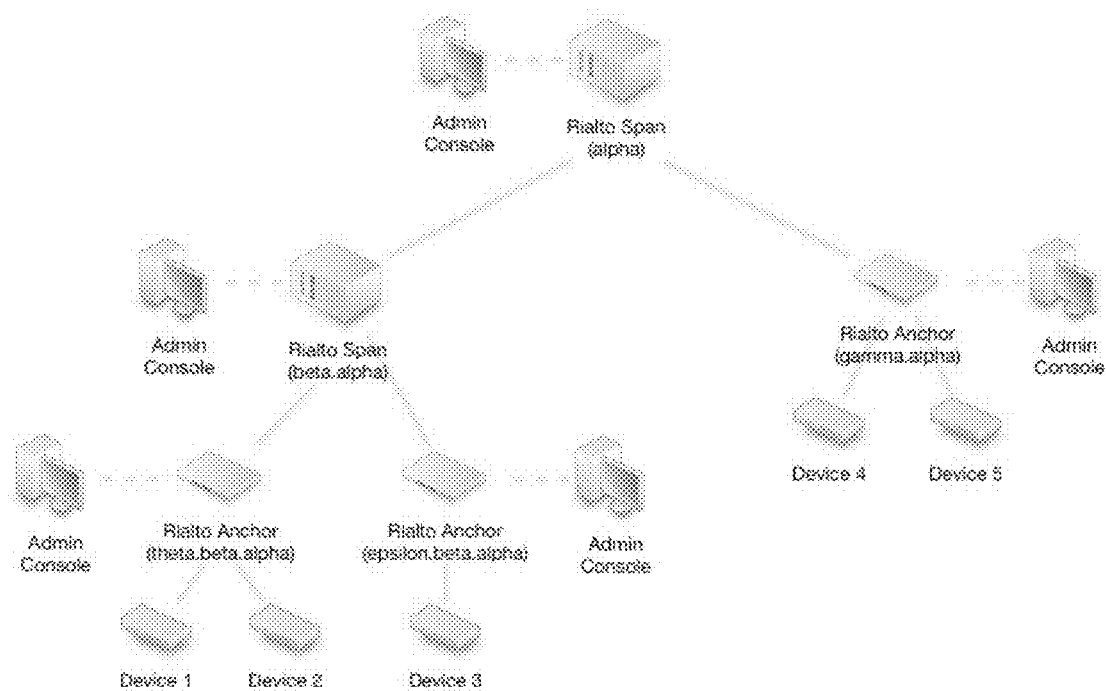
FIG. 7a shows an embodiment of the system of the present invention wherein managed communications between IT infrastructures are configured based on a decentralized management model.
Figure 7B:
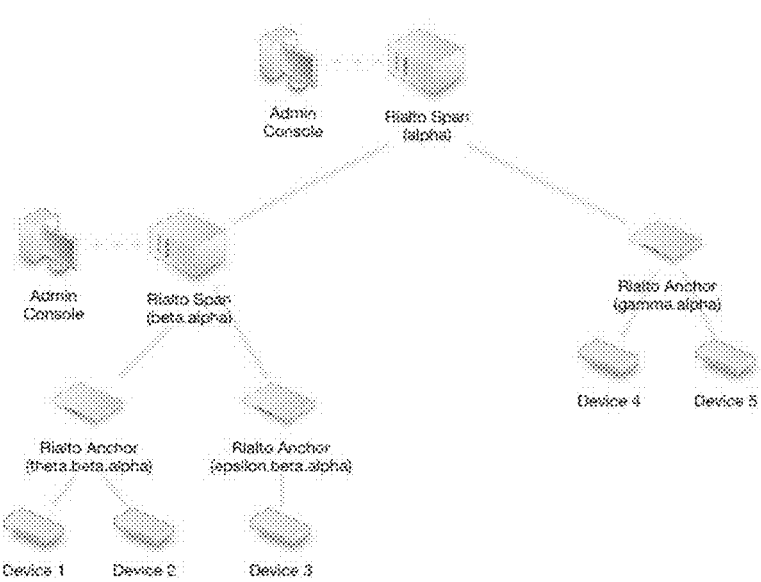
FIG. 7b shows an embodiment of the system of the present invention wherein management communications between IT infrastructures are configured based on an authoritative management model, in which management may be decentralized but certain master/servant relationships may be implemented between particular entities.
Figure 7C:
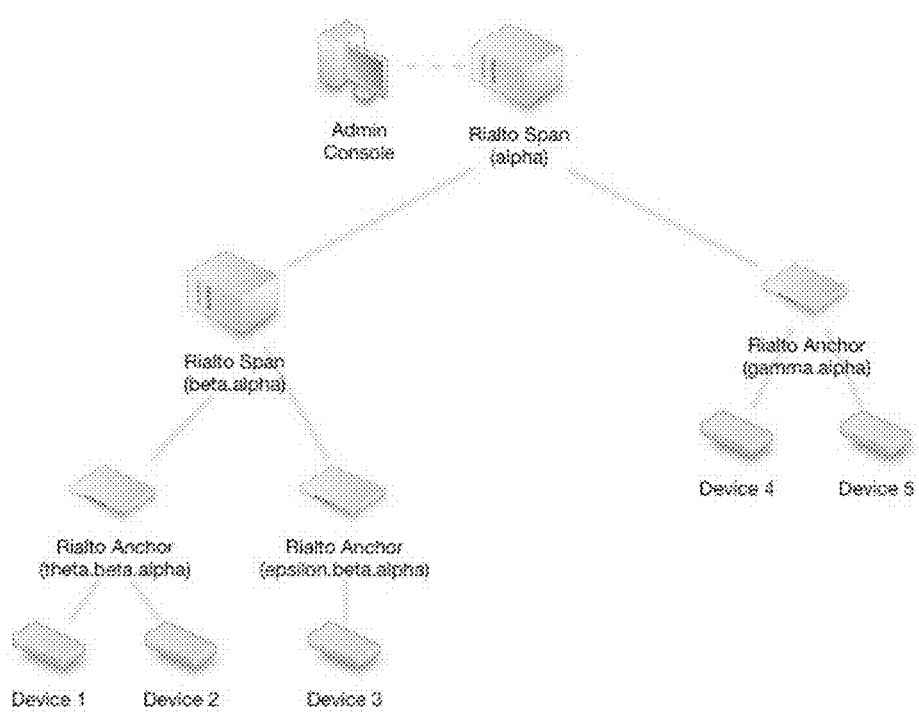
FIG. 7c shows an embodiment of the system of the present invention wherein managed communications between IT infrastructures are configured based on a centralized management model.

FIG. 7a for example illustrates how managed communications between IT infrastructures would be set up based on a decentralized management model. FIG. 7b for example illustrates how managed communications between IT infrastructures would be set up based on an authoritative management model, in which management may be decentralized but certain master/servant relationships may be implemented between particular entities. FIG. 7c for example illustrates how managed communications between IT infrastructures would be set up based on a centralized management model. FIGS. 7a, 7b and 7c illustrate that the same components and associated architecture can support different management models. As previously mentioned, a single implementation of the present technology may contain network segments that are subject to different management models.

For centralized management aspect, the system may include a web application (32), as shown in FIG. 8a, and which may include an administration utility (34). The administration utility (34) is used to register administrative users to the system, and establish their profile and associated administrative rights, which may be stored to the database (36). The administration utility (34) is operable to enable authorized users to configure one or more overlay networks as described herein, which in turn enables the implementation of information processes involving two or more client devices, where at least two client devices are associated with a "closed" network.

Database (36) may be a conventional relational database such as a MySQL™' Microsoft™ SQL, Oracle™ database, or the like. Database (36) may also be another type of database such as, for example, an objected-oriented database or a NoSQL database. As such, the system may include a conventional database engine for accessing database (36), e.g., using queries formulated using a conventional query language such as SQL, OQL, or the like.

The system may also include a conventional HTTP server application (e.g., Apache HTTP Server, Nginx, Microsoft IIS, or the like) allowing web application (32) to present dashboards, portals, and other interfaces in the form of web pages to web-enabled computing devices.

In one possible implementation, a bridge component utility (13) of embodiments of the present invention serves as an outbound and reverse proxy for various devices, which in a health information implementation of the invention illustrating the operation of the invention may consist of clinical devices. Clinical devices may communicate using one or more protocols for example DICOM, HL7, SOAP, RESTful or ebXML. Unlike prior art proxy servers, the bridge component (13) includes one or more external interfaces used to communicate with clinical devices, and an internal interface used for communication between the end points of the bridge component, or anchors (12). The bridge component (13) therefore includes at least two anchors (12), and at least one intermediate component or span (10), as previously described. The bridge component (13) is operable to act as a conduit for enabling network communications between clinical devices, and also between selected peer devices that may be connected to the clinical devices, without prior knowledge of the bridge component. This is because the bridge component is configured to also act as an outbound proxy. This allows the clinical devices to respond to requests from peer devices whether they be associated with their own network A, or an associated but remote network B, linked to network A by operation of one or more bridge components (13) of embodiments of the present invention.

It should be understood that the clinical devices, in a health information implementation of the present invention, may consist of a wide range of clinical devices that communicate with each other using standard protocols such as SOAP, ebXML, DICOM or HL7. Layered over TCP/IP, these protocols generally require clinical devices to be configured with addressing information for peer devices in the form of IP addresses or host names, and, where necessary, port numbers. The resulting complexity in terms of data dependencies, and required connections between client devices, was described previously. Establishing and maintaining these data dependencies that are part of such network configurations using prior art systems and approaches can be costly and time consuming to maintain. Maintaining the connections that are part of the network configuration requires the maintenance of addressing information between the associated systems, networks, or devices, which can be difficult or costly to establish. Also, changes to the network configurations, such as addition of devices (whether devices connected to a bridge component or peer devices connected to at least one device connected to a bridge component), based on prior art approaches may result in the need for reconfiguration of the network.

In contrast, use of the managed overlay network provided by one or more bridge utilities (13) of embodiments of the present invention places all of the associated network-connected devices of the various systems, networks, devices or resources, within a network configuration that in effect provides a consolidated HIE network. The consolidated HIE network of embodiments of the present invention, is simpler, and easier to maintain than prior art network configurations. In particular, the addressing required to establish any uni-directional or bidirectional connections between the components is much simpler and does not require updating, as previously explained.

An example of a prior art approach to enabling communication between divergent IT infrastructures on a secure basis would be to use Virtual Private Networks (VPNs) to secure cross-enterprise communication. These are complex to setup, require expensive equipment and support staff, and in most cases, essentially extend a host enterprise's network to include the client enterprise's network (i.e., any devices in the subnet on the client enterprise's side of the VPN connection can address any devices in the subnet on the host side of the VPN connection). In some cases, allowing multiple client enterprises to share information with each other and the host enterprise may also requires the use of VPN tunnelling, where the client must first VPN to the host, and then VPN again to the other client enterprise. All of this, and all of the certificates, passwords, access control and network topology changes required are challenging to manage.

In effect each device (such as a clinical device) needs to know the addressing information for the associated anchor device that serves the entity or entity domain. While all inter-anchor connection setup requests, which are best understood as signalling connections), flow through a hierarchy of span components, data connections established between any two anchor components carry data (such as clinical device data) on an end-to-end basis with no additional translation or mapping required. In other words, the edges or the overlay network of the present invention may be dynamic and may be constructed on an on-demand basis, as managed using the administration utility (34), on an end-to-end basis.

Translation and mapping may be issues in certain implementation. In another aspect of implementation of the present invention, anchor components (12) may include programming in order to perform some translation and mapping of the data being exchanged between devices. One possible example is anchor components (12) including "message morphing" functionality, which in the context of medical device communications, means changing the tags in message headers so they are acceptable to the devices involved in the transaction.

The overlay network of embodiments of the present invention may enable rapid scaling of deployment, for example by enabling a "region" to be divided into "sub-regions", as shown in FIG. 5 for example. This is in part possible because of a hierarchical naming scheme that is implemented in embodiments of the system of embodiments of the present invention.

The present invention may implement a number of different possible naming schemes.

Naming Scheme 1: Host Domain-Based Naming

In this naming scheme, anchor and span components have hierarchical names based on the domain names assigned to their respective operating entities. So, for example, a root span serving the Boston area might have the following name: Span@boston. A Span under this root Span for the Teleradiology network might have the following name: Span@telerad.boston. Anchors representing the hospitals and clinics under this Span would have names of the following form: Anchor@hospital1.telerad.boston, or Anchor@clinic22.telerad.boston. One advantage of using this scheme is that it is possible to reuse standard libraries that were written to parse and validate email addresses and web URLs.

Because they are similar to real email addresses, they are also easy for people to understand. However, it may be necessary to use longest suffix matching when routing signalling connection setup requests are made through one or more span components.

Naming Scheme 2: Reverse Domain-Based Naming

This alternative scheme is, as the name suggests, similar to the previous scheme, but reversed. In this naming scheme, the above examples would be "boston" for the root span, "boston.telerad" for the child span and "boston.telerad|hospital1" and "boston.telerad|clinic22" for the respective anchors. The use of a "|" character to identify Anchors eliminates the need for the Anchor@ and Span@ prefixes. Efficient longest prefix matching may be performed to route connection requests under this naming scheme.

In one aspect of the present invention, the bridge component of embodiments of the present invention is operable to abstract configuration parameters of devices linked to the overlay network presented (for example clinical devices in an HIE network). The abstraction of configuration parameters shields these devices from changes to the addresses of peer devices. So, for example, because the EMR applications at the hospitals in Regions A and B connect to the Document Registry at the national data center by means of a bridge component, a change to the port number by means of which the Document Registry accepts client requests will not require reconfiguration of the EMR applications as only the anchor endpoint at the national data center will need to be aware of the change. The process involved in setting up and tearing down connections between devices is described below.

Specific configuration for each system or device may be stored to the device registry (26) maintained by each anchor component (that serves the device in question). For each device, there may be a number of parameters for such configuration, for example DeviceType, DeviceID, Name, Vendor, Version, local URI (protocol://host:port/path), physical location parameters, contact person details, etc. The key parameters here are DeviceType (examples of which might be HL7V2 and DICOM) and DeviceID (a unique identifier string assigned to the device for the relevant anchor).

Note that each anchor/span component has a unique identifier (see earlier discussion about naming schemes) which may be referred to as a unique identifier (UID). For generality, this identifier may also be referred to as a Bridge Component Identifier (BCI). The abstract configuration which may be used by the system of embodiments of the present invention may hide details of the device's private network address, physical location, etc. and may simply use the following: {UID, DeviceID}. This abstract configuration uniquely identifies any device connected to a particular bridge (13).

With respect to specific device configuration, the types of configuration parameters available for each type of device may vary. To accommodate this, the system may use a free-form string parameter for each device configuration, which may be referred to as "metadata". This field contains a delimited set of name-value pairs that are specific to that type of device. For example, for a DICOM device this field might be: "AE_TITLE=TestPACS". For an HL7 device, this field might be of the form "RCVING_APPLICATION=TestApp&RCVING_FACILITY=TestFacility". This flexibility with metadata allows the configuration for different types of devices to be modelled.

Security

As best shown in FIG. 8a, the system of the depicted embodiment of invention may include a security layer (38) that provides security functionality for protecting data communicated by operation of the overlay network of embodiments of the present invention. The following section describes examples of security features that may be implemented as part of the security layer.

Figure 8B:
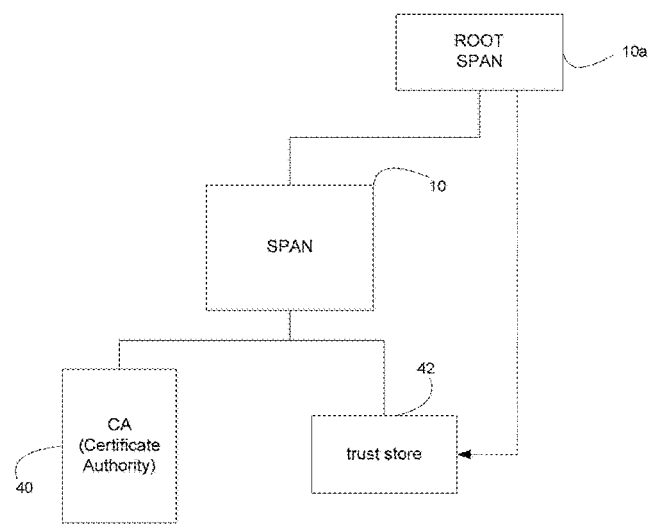
FIG. 8b shows a possible implementation of a span component, exemplary of an embodiment of the present invention.

As shown in FIG. 8b, in one possible implementation, each span (10) may include programming that allows it to function as a Certificate Authority (CA) (40) for all its child anchor/span components. When child anchor/span components are deployed, a trust store (42) may be accessed, which contains the public key certificate of the root span (10a). This root span (10a) acts as a root of trust, certifying child components as necessary by providing them with certificates. And a child component, whether an anchor or span, can authenticate a valid peer anchor/span using this root certificate. The certificates issued by a span are only used by its subsystems and child anchor/span components (using for example specific fields in the X.509 certificates to restrict this).

Anchors (12) may also act as a CA, but only for their software subsystems, in that they only issue certificates to themselves. Again, specific X.509 fields may be set by parent spans to restrict this.

All anchor and span components may also maintain key stores locally that contain their private keys and certificates.

In another possible implementation, a Trusted Platform Module (TPM) may be used to store each anchor/span's private key.

A formidable challenge to setting up any secure distributed system is the generation and exchange of the digital certificates used to authenticate and secure the connections between systems. In one aspect of the invention, and in one aspect of the improvement over the prior art provided by embodiments of the Applicant's bridge technology, the process of exchanging digital certificates may be streamlined or automated.

Each anchor component and span component is operable to periodically generate its own cryptographic key pairs and request a corresponding digital certificate from its parent span component, if any. This certificate is requested when an anchor component or span component is first configured to be part of a bridge component, and periodically thereafter just before the certificate expires. To prevent unauthorized anchor components or span components from being configured to become part of a particular bridge component, the anchor components and/or span components are required to supply their parent span component with an authentication token when they request their first digital certificate.

Certificates for compromised anchor components or span components may be may be revoked by the parent bridge span (if any) using for example a Certificate Revocation List (CRL). This process, as well as the generation of key pairs and certificates, is further described below.

It should be understood that each entity using one or more bridge components of embodiments of the present invention to enable for example an HIE network, will need at least one endpoint for a bridge component, i.e., an anchor component. The anchor component is best understood as a network appliance that is placed within the entity's private network however is publicly addressable, for example via the public Internet, and thereby authorized communication sessions may be made between the anchor component (first anchor component) and designated remote network connected devices, namely its parent span component and any other anchor components that are established as being associated with the first anchor component by the parent span component, and by extension the administration utility (34) which is operable to establish the associations between anchor components, between which communications are enabled by operation of their associated span component(s).

The bridge utility can either be distributed as an appliance or software. When distributed in software form, it can either be just the Bridge Utility application or a virtual machine containing the entire appliance software stack, as described below.

Figure 9A:
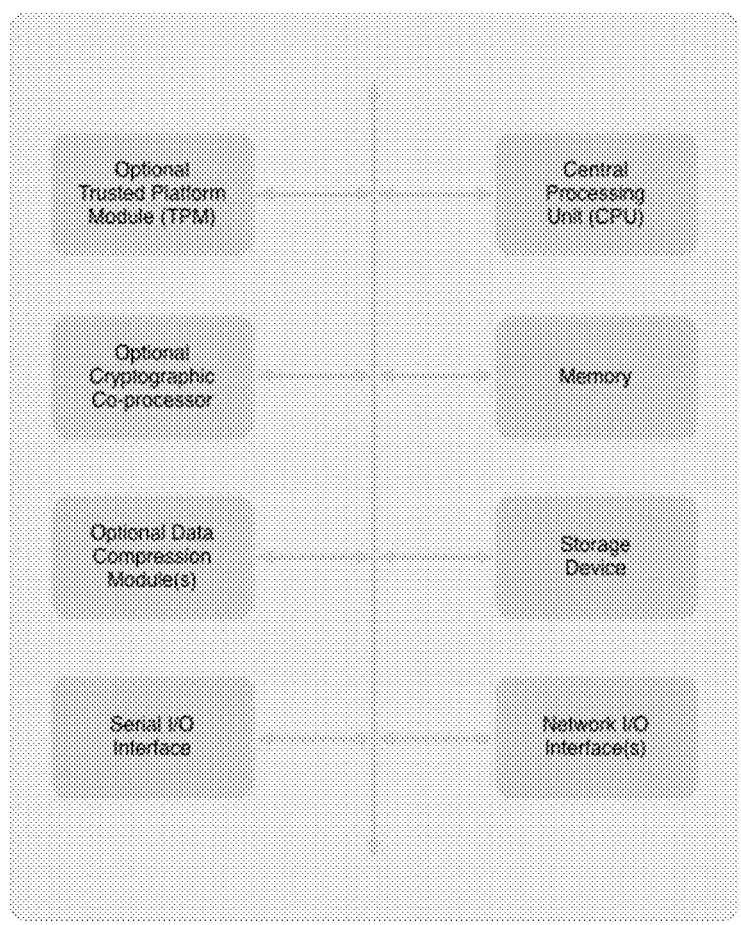
FIGS. 9a and 9b show possible hardware and software implementations of the anchor component respectively, exemplary of embodiments of the present invention.
Figure 9B:
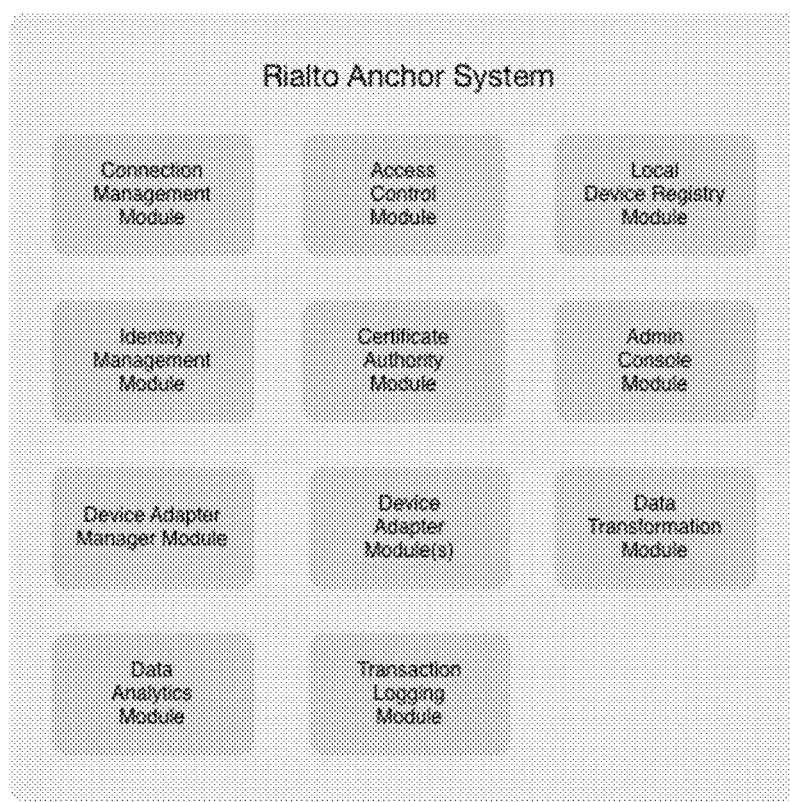
Figure 10A:
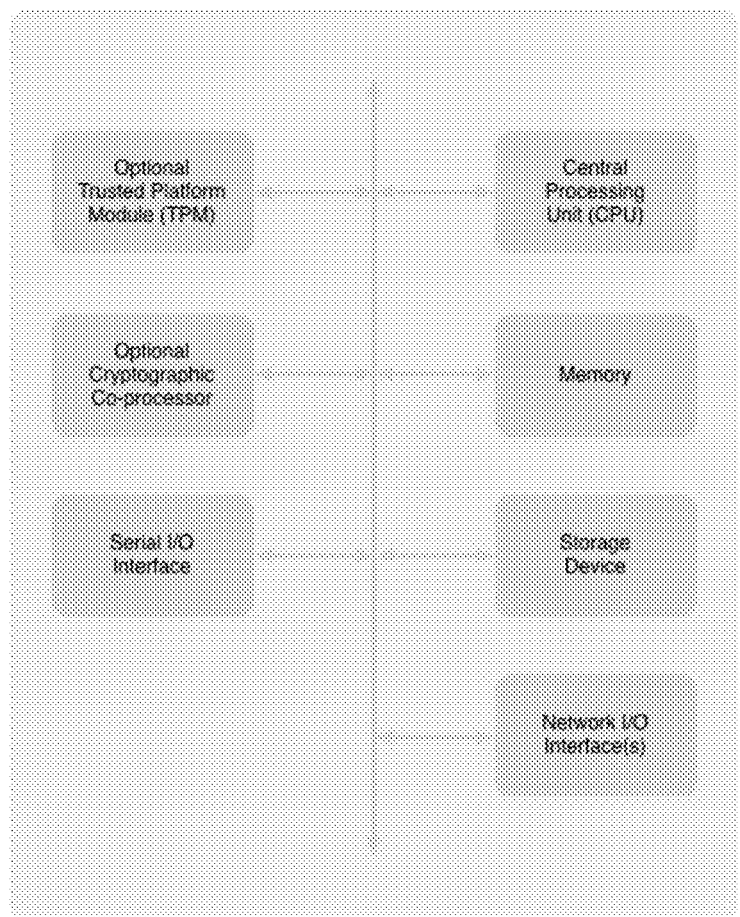
FIGS. 10a and 10b show possible hardware and software implementations of the span component respectively, exemplary of embodiments of the present invention.
Figure 10B:
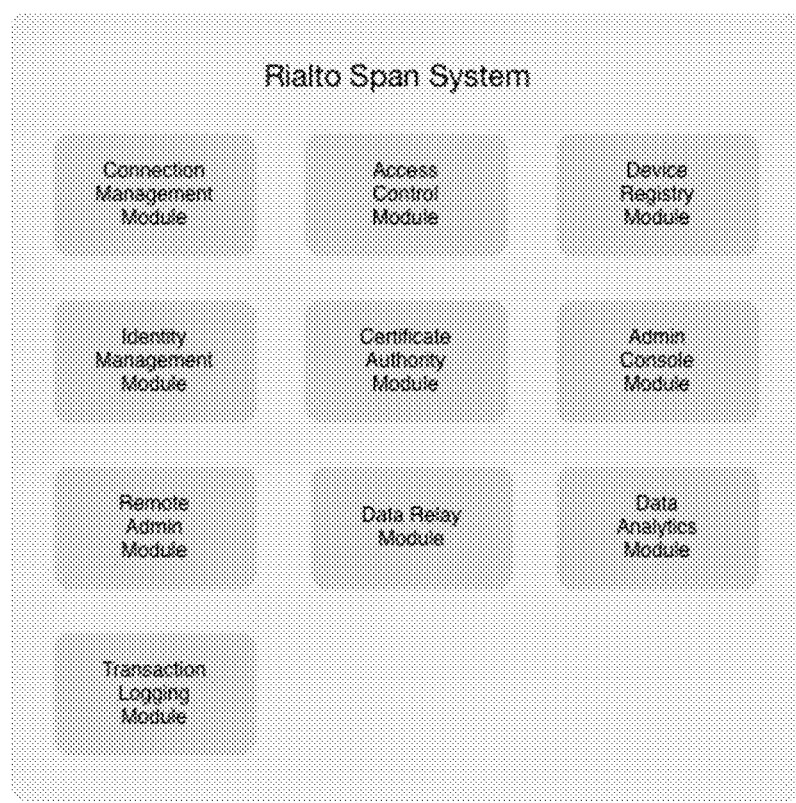

FIGS. 9a and 9b show possible hardware and software implementations of the anchor component respectively. FIGS. 10a and 10 show possible hardware and software implementations of the span component respectively.

Components of the appliance's software stack:
Operating System (typically some flavour of Linux)
Java Virtual Machine (version 6+)
Bridge Utility application
Components of the appliance's hardware stack:
Processor (dual processor, each with at least 4-8 cores)
Memory (at least 32 GB)
Storage (combination of 128 GB solid state drive and 2 TB spinning disk)
Network interfaces (4× Gigabit NICs)
Serial port for on-site technical support The bridge utility may be run on any manner of network-connective device including a mobile device or embedded device.

As explained earlier, the anchor component of embodiments of the present invention serves as an outbound and reverse proxy for example for the clinical devices in that entity, setting up connections with peer anchor components (that also may be established within the entity's network) in order to build a connection between clinical devices behind these anchor components. As part of establishing a connection with a peer anchor component, each anchor component is operable to authenticate with one or more of its peer anchor components, for example using cryptographic credentials as described earlier. If this authentication phase succeeds, two or more anchor components that have authenticated one another may then establish an encrypted connection between themselves to transmit data being relayed between their clinical devices.

In one implementation of the present invention, the security layer (38) shown in FIG. 8a may implement Transport Layer Security (TLS) technology, which is now the de facto standard for securing communications over computer networks. TLS augments the TCP/IP model's Transport Layer by adding encryption and authentication (of both data and the communication partners) that is transparent to the Application Layer above it.

A wide range of cipher suites are available that enable the use of TLS to encrypt and authenticate data, as well as its ability to authenticate communication partners. Generally speaking, the security layer of embodiments of the present invention, implementing TLS based encryption/authentication, authenticates server endpoints of a TLS connection, that is, the communication partner that responds to a connection request, in a TLS client authentication mode. This provides servers with the ability to access control at the Transport Layer, and also to only accept connection requests from trusted clients (for example associated anchor components, by operation of the administration utility (34). When TLS is configured to use (Public Key Infrastructure) PKI for endpoint authentication, the clients and associated servers establish trust relationships dynamically, and by exchanging X.509 public key certificates out of band, they may begin to communicate with one another.

It should be noted that some applications, such as web browsers, ship with trusted certificates pre-installed, while others, such as a PACS, require systems administrators to manually install the certificates. Certificates may also be chained, allowing an application to trust a Certificate Authority's root certificate, and then validate any application (or intermediate) certificates issued by the Certificate Authority. In many cases, particularly with HTTP-based applications, installing a new certificate in an application's trust store results in a service disruption while the underlying web server is restarted.

To ensure their security in face of key exposure, X.509 certificates typically have a period of validity that ranges from days to several years, with certificates that are used more frequently having a shorter period of validity. Expired certificates may cause TLS authentication failures, preventing applications using them from communicating. System administrators must therefore track certificate expiry dates, ensuring expired certificates are replaced in a timely manner in order to prevent service disruptions.

A certificate may also be revoked before its expiry, for example, in the event the associated application is compromised, by adding its serial number to a list maintained by the certificate's issuer—the CRL. CRLs may either be downloaded automatically by applications (when such CRLs are publicly accessible and TLS is configured to do so), or manually updated by systems administrators. When manually updated, systems administrators must monitor CRL changes to ensure the security of associated services.

Because the bridge components of embodiments of the present invention serve as a conduit for all network enabled communications between clinical devices, all communications between clinical devices via are secure because of the security features that are embedded in the bridge component of embodiments of the present invention. This is particularly useful when enterprises use a public or shared network such as the Internet as the backbone for their HIE network—the one or more bridge components implemented using the present invention secure the communications between clinical devices across these entities. In many IT infrastructures legacy devices may be used that do not support TLS. For example a PACS system that is ten years old or more generally does not support TLS; however, embodiments of to the present invention allow data stored by the system to be shared via the bridges described herein, enabling secure delivery of data over high performing, low cost public networks between entities.

The security layer of embodiments of the present invention is also operable to enforce one or more access control policies across the overlay network defined by the present invention. Access control policies may be defined using industry standard policies such as XACML and by the administration utility (34) specifying the particular devices will allow connectivity to and from what other devices, and also other connectivity parameters such as when connectivity will be allowed, through what anchor components, and so on. These policies may be defined such that they are hierarchical in nature, and specifically the present invention enables effective deployment of such hierarchical policies in that anchor components and span components are configured to inherit policies from their parent span components, in addition to defining their own policies. Also, access control policies from parent span components may be configured to override policies defined by child anchor components and span components.

In another aspect of the invention, access control decisions may be made on a per connection request basis by both anchor components and span components, and access control processes may be re-evaluated periodically to ensure changes in policy to adjust to changing entity driven access policies, new best practices, or changing standards. These changes may be enforced within fixed time frames, across all relevant devices and associated connections, by operation of embodiments of the present invention. In this regard it is useful to review the connection set up process, detailed below.

Clinical Device Discovery

When a device (such as a clinical device) attempts to connect to a peer device by means of a bridge component, an anchor component provided inside a participating network (such as the information and communication network of a health enterprise) locates the peer device and establishes a connection with it via a peer anchor component that has been installed and configured to provide information services to the relevant network, for example the healthcare enterprise associated with the peer device. In one particular aspect of the implementation of the invention, and as shown in FIG. 8a, a central registry (46) is provided, and maintained, to include information for all available devices using the technology of the present invention, and linked to one or more entities participating in an information exchange enabled by the present invention, as explained below. Central registry (46) may be implemented as a known dynamic directory, stored to database (36). As previously explained for each device, a DeviceID string is may be maintained which is unique to the associated anchor component. When combined with the anchor component's unique ID, it is possible to uniquely identify each device, which may be referred to as a "Device Address". The central registry (46) may be implemented in a number of ways. For example, the central registry (46) may be implemented in the manner of a known central registry, but implemented at a root span for a bridge. The central registry (46) may also be implemented as a set of hierarchical registries, one for each span in the bridge, such that a root span has information for all of the devices, and a child span only has information for the devices local to their child anchors and span.

As explained earlier, the anchor components may be deployed in a healthcare enterprise's private network. Presence in these enterprises' networks allows the anchor components to detect the availability of clinical devices via network scanning, which may be implemented using a variety of network scanning techniques known to those skilled in the art. Using for example fingerprints of known devices, knowledge of commonly uses ports and protocols, the anchor components are operable to scan associated networks or sub-networks to detect and identify associated devices, including based on extrapolation of function, i.e., detecting and identifying other clinical devices on the network.

In a particular aspect of the invention, the anchor component is operable to establish an administrative interface that is part of the admin GUI (21) previously described. In one implementation, the administrative interface enables one or more administrative users for the operator of the network to specify the type and capabilities of available devices, as well as to manually add available devices that the anchor component may not have been able to detect (for example because the device in question is new). The administrative interface may be similar to those used for other network appliances. The admin GUI (21) and its functions may be password protected and as previously explained in one implementation cannot be accessed from outside the private network served by the anchor or outside for example a data center that houses the associated span.

Once the available devices are detected and identified, each anchor component is operable to initiate the entry of information for each device into the central registry (46). The system may be configured so that information in the central registry (46) is dynamically distributed to all associated peer anchor components, including as previously described. In other possible implementations a distributed device registry may be used that replicates automatically if changes are made to any one or more of the distributed components. In one aspect, a registry associated with the anchor components stores a cache of the devices that the anchor has used up to a point in time, as opposed to all devices connected to the system. This may be advantageous particularly in implementations where there may be thousands of connected devices.

As previously explained, a data model for devices may be provided. In one approach to implementing a distributed device registry, each anchor maintains a local device registry that contains its local devices, i.e., those within its private local network. It periodically informs its parent span about the presence of these devices by sending it notifications. These notifications are then forwarded throughout the bridge to all spans. When an anchor needs to find the peer anchor that has a specific device, it only needs to query its parent span for a list of all matching devices. This particular model is optimized to minimize query time—particularly desirable when device adapters need to build transient connection configurations for each connection attempt. However, there may be a potentially huge database of device configurations scattered across a potentially large number of spans. Because spans are generally server-class components, this is not a significant issue as associated databases can handle many records. Another aspect is that records for all remote devices are generally not stored on each anchor, which may be important for implementations involving mobile devices and embedded systems.

In an alternative approach, the device registry functions more or less in the same way as traditional Domain Name System (DNS): each anchor maintains a local device registry containing only its local devices, and when a peer anchor wishes to find one of these devices, it queries its parent span, which in turn queries other intermediate Spans (if any) on the signalling path to the anchor recursively to finally query the destination anchor. Such queries are clearly computationally expensive and relative to the implemented scheme, significantly slower. This model does however, eliminate the need for large databases at each Span containing all available devices.

In yet another approach, a hybrid approach may be implemented. In this hybrid approach, spans (server-class components) implement the above-discussed system of notifications relating to presence of devices. Meanwhile, each anchor may implement either this notification system, or the above-discussed query-on-demand system, based on the resources available at the anchor. For example, a server-class anchor may implement the notification system, while an anchor implemented on lower-power embedded device or mobile device may implement the query-on-demand system.

With the local device discovery functionality described above, it is possible for an anchor component to detect and identify clinical devices that reside in the same sub-network as the anchor component, i.e., within the healthcare enterprise's private network. In order for example clinical devices at peer (remote) healthcare enterprises to be able to communicate with these devices associated with the remote networks of the peer healthcare enterprises, anchor components serving such remote networks need to include these devices in their own registries, which the system of the present invention enables by operation of "remote device discovery" which is explained below.

From a functionality perspective, remote device discovery works as follows: after an anchor component updates its local device registry with information about local devices, it notifies its parent span component about these clinical devices (subject to access control policies for that entity associated with the parent span component in question. This span component in turn informs its other child anchor components and span components, as well as its parent span component, if any. As such, notification of newly discovered clinical devices propagates through the overlay network of the present invention, allowing peer anchor components to update their device registries. Notifications about the discovery of clinical devices identify the device, metadata associated with that device (e.g., the Application Entity (AE) Title for a DICOM device) and the unique ID of the peer anchor component serving that device.

Analytics

As shown in FIG. 8a, the system of embodiments of the present invention may include an analytics utility (48). The analytics utility (48) is operable to monitor the performance of the overlay network, including by reporting on QoS metrics, analyze network traffic, and either recommend or automatically institute QoS improvement measures such a traffic optimization, migration of specific information, and use of bio-surveillance methods (further explained below).

Because the bridge components of the present invention are operable to act as a conduit for network device to network device communications (including communications between clinical devices associated with different information networks), it is possible to monitor a wide range of metrics about these data transmissions. Examples of these metrics for clinical devices include device response times, round-trip-times and up-time. Similar metrics may be applied to infrastructure components (anchor components and span components), in addition to metrics such as load, processor utilization and network link saturation. When combined, these metrics enable the bridge components to identify potential system failures and performance bottlenecks in the HIE network, and suggest optimizations, which may be local and/or distributed. For example, spans can provide distributed reporting, in that they cover themselves and any child anchor/spans, while anchors would provide more localized reporting in that they only cover the devices connected to them.

In addition to monitoring the metrics described earlier, it is possible for the bridge components of embodiments of the present invention to analyze metadata or artefacts being exchanged in the HIE network to optimise the availability of data across the HIE network.

Embodiments of the present invention are operable, for example, to identify clinical devices under heavy load or in sub-optimum data locations: a document repository located at a regional data center might be more optimally located at a national data center if many healthcare enterprises outside that region are accessing it. The bridge component of embodiments of the present invention may report this to systems administrators, alongside supporting data. If permitted under access control policies for the healthcare enterprise hosting the document repository, the bridge technology could also automatically migrate artefacts from this document repository to a similar repository at the national data center.

Traffic Routing

Because the bridge technology of the present invention is operable to monitor response time and data throughput metrics, the bridge technology may use these metrics when setting up connections between anchor components. For example, if the physical network links between two hospitals and a data center has more capacity than the network link between the two hospitals, and therefore the bridge technology of embodiments of the present invention may be operable to automatically route data flowing between the two hospitals via the data center, for improved efficiency and yet with requisite security. In such a scenario, the data center's anchor component would serve as a relay for data being exchanged between the anchor components deployed within each of the hospital's network.

Biosurveillance

Because the bridge technology of the present invention is operable to analyze metadata attached to artefacts being exchanged across an HIE network, it is possible for the bridge components to be used as a biosurveillance platform to monitor public health. Examples of this include monitoring lab reports and pharmacy prescriptions for potential correlations that might indicate the development of a pandemic. If permitted to look inside artefacts under access control policies specified by healthcare enterprises, the bridge technology would be capable of building a detailed model of healthcare activity. It should be understood that the analytics engine (48) (FIG. 8a) may implement a variety of technologies or techniques for identifying or predicting events such as a pandemic.

Advantages

In one implementation, the computer system of embodiments of the invention is operable to enable the data integration of two or more HIEs, where one or more of the HIEs may incorporate or be linked to legacy networks or legacy components, be associated with legacy security protocols, and/or be configured based on legacy communication protocols. Embodiments of the present invention may accomplish this integration in a way that is cost effective and continues to meet security requirements, despite the legacy aspects and in particular differences in protocols, or the way aspects of protocols are interpreted.

Further, costs of change management may be reduced if there are changes to devices, computer systems, or information processes.

The computer system is also operable to enable integration of divergent computer systems and/or data networks more generally, so as to enable the exchange of information between the divergent computer systems and/or data networks, in a way that accommodates changes from time to time in various aspects of such computer systems and/or data networks. Computers systems and data networks may be subject to various changes such as upgrades or updates to components (including hardware, software or middleware components). Using prior art solutions, when computers systems or data networks are integrated, and the computer systems or data networks are subject to a changes such as adding new components, implementing new data architectures, or implementing new security infrastructure, generally speaking costly and time consuming updates to the integrated solution would be required. With the computer system of embodiments of the present invention, implementation of the integrated solution may be faster and more cost effective, and also may be maintained despite such changes to the computer systems or data networks integrated as part of the integrated solution.

Further Aspects of Implementation

Embodiment of the present invention may be implemented using a distributed and networked computing environment comprising at least one computing device. In a particular implementation, at least three sets of computing devices may be provided. Each set of computing devices may comprise one or more computing devices linked by a network, as detailed below.

Further enhancements may be provided wherein one or more of the computing devices are mobile devices, embedded devices, or other wirelessly networked devices. For example, the monitoring device (28) shown in FIG. 8a may be a wireless device. Wireless networked devices connected to the computer system of embodiments of the present invention may include wearable devices for monitoring a patient such as blood pressure monitor, glucose monitoring device, heart rate monitor, and so on. For example, as noted above, the network may be or include a wireless network, the wireless network including a wireless gateway for linking the wireless network to the Internet. The network-connected devices as previously described may consist of wirelessly networked devices that are operable to access the Internet via a wireless gateway. The wirelessly networked devices described may include a browser for interacting with the web server to access functions of the web application (32). Alternatively, the wirelessly networked device may include a mobile application, which may include one or more utilities or features providing a record completion function which interoperates with the web application (32) to enable completion of records using the wirelessly networked device. The wirelessly networked devices could also be equipped with additional functionality for providing information regarding users that enables the targeting of particular users, including for example a Global Positioning System (GPS) receiver operable to provide GPS location information to invite particular users to complete tasks or sub-tasks or to allocate tasks to particular participating users. The wirelessly networked devices may also include one or more accelerometers or other movement sensors operable to provide movement-based or gesture-based information. Thus the messaging to be returned to the platform may include location, movement and/or gesture relevant content.

It should be understood that the wirelessly networked device as described may consist of a hand-held two-way wireless paging computer, a wirelessly enabled palm-top computer, a mobile telephone with data messaging capabilities, a portable digital media player, or a wirelessly enabled laptop computer, but could be any type of mobile data communication device capable of sending and receiving messages via a network connection. The majority of current mobile communication device users, however, use a mobile telephone with data messaging capabilities, such as server addressing capabilities such as Short Message Service ("SMS") or Multimedia Messaging Service ("MMS") or data including GPRS or 3G. The present invention therefore provides means for providing the functionality described herein, from mobile communication devices that are relatively common and inexpensive.

Figure 11:
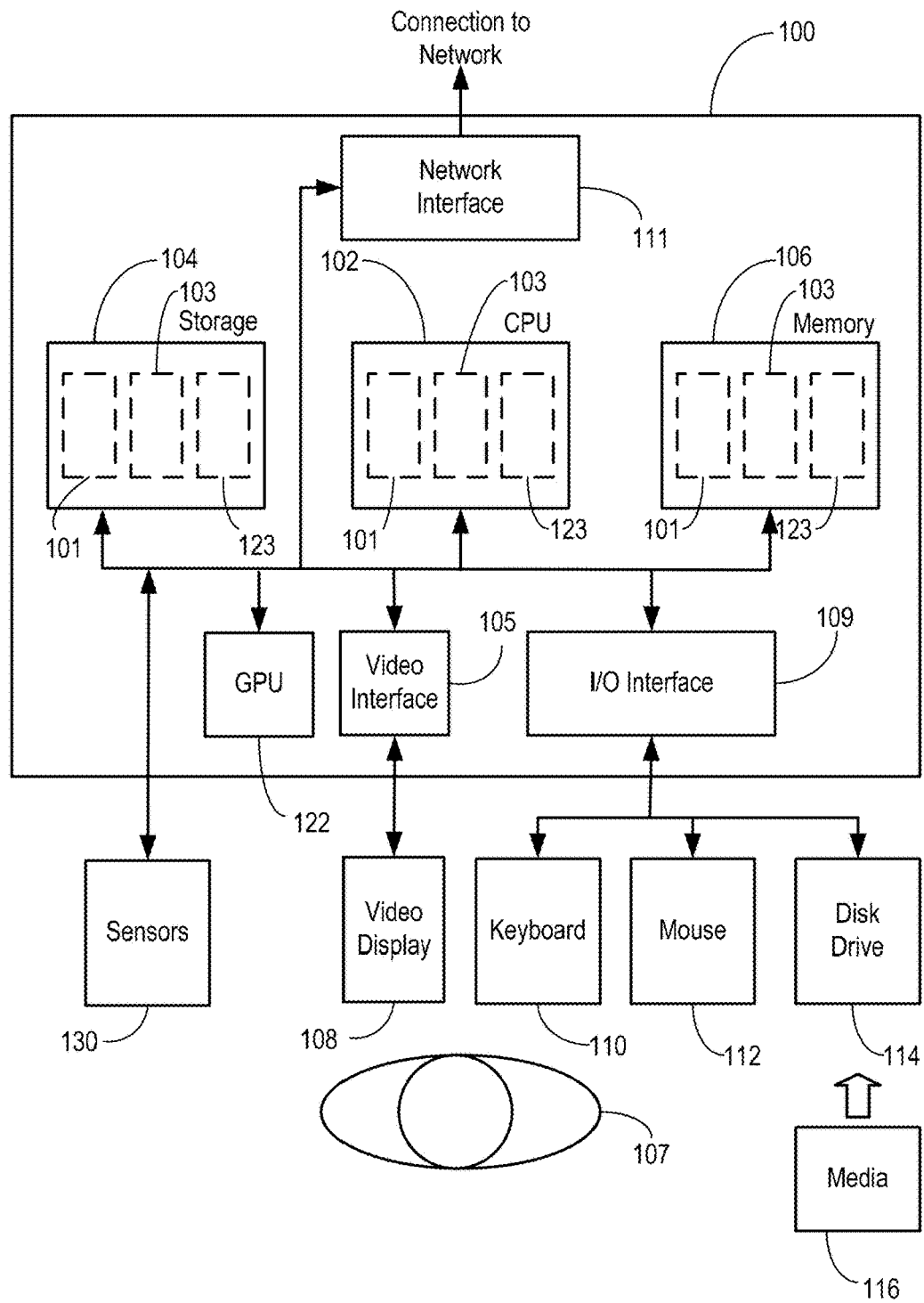
FIG. 11 is a schematic diagram of the hardware components of the system, according to an embodiment of the present invention.

FIG. 11 shows a schematic diagram of an example computing device that may be used to implement one or more components (e.g., spans and anchors) of embodiments of the present invention.

As shown, the computing device (100) may include at least one central processing unit ("CPU") (102) connected to a storage unit (104) and to memory (106).

CPU (102) may be any type of processor, such as, for example, any type of general-purpose microprocessor or microcontroller (e.g., an Intel™ x86, PowerPC™, ARM™ processor, or the like), a digital signal processing (DSP) processor, an integrated circuit, or any combination thereof.

Storage unit (104) may include one or more storage devices such as a hard disk, solid-state disk, or the like. Storage unit (104) may also be partly or wholly cloud-based, accessible via a network. Storage unit (104) may host database (36).

Memory (106) may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

The CPU (102) may process an operating system (101), applications (103), and data (123). Data (123) may include data corresponding to the one or more webpages of web application (32). The operating system (101), applications (103), and data (123) may be stored in storage unit (104) and loaded into memory (106), as may be required. Operating software (101) may, for example, be a Microsoft Windows™, Unix™, Linux™, OSX™ operating system or the like.

Applications (103) and data (123), when processed at CPU (102), provide the functionality of the span/anchor components, including, e.g., web application (32). Application (103) and any components thereof may each be implemented in a high level procedural or object oriented programming or scripting language, or both. However, alternatively, applications (103) and any components thereof may each be implemented in assembly or machine language, if desired. The language may be a compiled or interpreted language.

The computing device (100) may further include a graphics processing unit (GPU) 122 which is operatively connected to CPU (102) and to memory (106) to offload intensive image processing calculations from CPU (102) and run these calculations in parallel with CPU (102).

An operator (107) may interact with the computing device (100) using a video display (108) connected by a video interface (105), and various input/output devices such as a keyboard (110), mouse (112), and disk drive (114) connected by an I/O interface (109). In known manners, mouse (112) may be configured to control movement of a cursor in video display (108), and to operate various graphical user interface (GUI) controls appearing in the video display (108) with a mouse button. Disk drive (114) may be configured to accept computer readable media (116).

The computing device (100) may connect to one or more networks via network interface (111). Network interface (111) allows the computing device (100) to communicate by way of wired or wireless communications with other computing devices by way of such networks.

The computing device (100) may be embodied in various form factors including one or more desktop and laptop computers, and wireless mobile computer devices such as tablets, smart phones and super phones. It will be appreciated that the present description does not limit the size or form factor of the computing device on which the present system and method may be embodied.

In some embodiments, computing devices (100) may have a different architecture or configuration, including a distributed server architecture, a server farm, or a cloud based computing environment.

While the disclosure provides certain details regarding one or more computer program aspects of the present invention, the functions of the computer program are explained without limiting the application to the invention to any particular computer program architecture. Each functional component may be implemented as part of a computer program module with multiple functions, or may be implemented as including one or more other functional components. A skilled reader will understand that numerous possible implementations are contemplated.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Although the disclosure has been described and illustrated in exemplary forms with a certain degree of particularity, it is noted that the description and illustrations have been made by way of example only. Numerous changes in the details of construction and combination and arrangement of parts and steps may be made. Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations and modifications are possible, and even advantageous, in various circumstances. The invention is intended to encompass all such variations and modification within its scope, as defined by the claims.

The invention claimed is:

1. A computer network implemented system for managing network communication in a health information exchange environment comprising:
one or more computers that include at least one memory and at least one processor, the one or more computers implementing one or more bridge utilities, the one or more bridge utilities creating and maintaining a network overlay including at least one network layer layered over communication protocols of divergent network infrastructures in the health information exchange environment, each bridge utility, executed by the at least one processor, comprising:
a first anchor component connected behind a firewall of a first health information communication network of a first healthcare enterprise, the first anchor component providing an outbound proxy for devices on the first health information communication network; and
a second anchor component connected behind a second firewall of a second health information communication network of a second healthcare enterprise, the second anchor component providing an outbound proxy for devices on the second health information communication network;
the first anchor component and the second anchor component configured for network communication with each other though their respective firewalls and via at least one span utility;
the first anchor component configured to:
detect clinical devices on the first health information communication network;
maintain, in a first device registry, a first set of clinical device communication protocol parameters for the detected clinical devices on the first health information communication network; and
communicate, to the at least one span utility, device identifiers identifying the detected clinical devices on the first health information communication network;
the second anchor component configured to:
detect clinical devices on the second health information communication network;
maintain, in a second device registry, a second set of clinical device communication protocol parameters for the detected clinical devices on the second health information communication network; and
communicate, to the at least one span utility, device identifiers identifying the detected clinical devices on the second health information communication network;
the first and second anchor components and the at least one span utility configured to: send and receive signaling communications between them for configuring anchor to anchor connections and for sharing the device identifiers for the detected devices on the first and second health information communication networks; and
the second anchor component configured to:
upon receiving a data connection request from a first clinical device on the first health information communication network via the first anchor component, the data connection request including a device identifier associated with a second clinical device detected on the second health information communication network, establishing a first data connection with the first anchor component; and
bridging the first data connection to the second clinical device using the second set of clinical device communication protocol parameters in the second device registry;
wherein the signaling communications between the first and second anchor components for sharing the device identifiers and for configuring the anchor to anchor connections are routed via a connection management layer via the at least one span utility; and
wherein the first data connection enables transmission of data between the second anchor component and the first anchor component outside the connection management layer, and wherein the data transmitted over the first data connection is not routed via the at least one span utility.

2. The system of claim 1, wherein the system is based on a decentralized information architecture.

3. The system of claim 1, comprising one or more server computers configured to dynamically create and remove connections between the first and the second anchor components and the at least one span utility.

4. The system of claim 1, wherein the first or the second health information communication network spans a plurality of data networks.

5. The system of claim 1, wherein at least one of the first and the second anchor components and the at least one span utility includes a remote management/configuration component.

6. The system of claim 1, wherein at least one of the first and the second anchor components implements a Quality of Service layer allowing optimization of data flow between the associated devices or computer systems.

7. The system of claim 1, wherein the data communication between the first and the second anchor components carry clinical device communication protocol communications between their associated devices or computer systems according to at least one of DICOM, HL7, SOAP, RESTful and ebXML protocols.

8. The system of claim 1, wherein at least one of the first and the second anchor components is configured to perform data translation or data mapping on communications between the associated devices or computer systems.

9. The system of claim 1, wherein at least one of the first and the second anchor components maintains a local registry of the associated devices or computer systems.

10. The system of claim 9, wherein the at least one of the first and the second anchor component is configured to transmit at least a part of its local registry to at least one other of the anchor components or at least one of the at least one span utility.

11. The system of claim 1, wherein the bridge utility further comprises a central registry of the devices or computer systems associated with each of the anchor components.

12. The system of claim 1, wherein at least one of the first and the second anchor components is configured to authenticate itself to at least one other of the anchor components or at least one of the at least one span utility.

13. The system of claim 12, wherein the at least one of the first and the second anchor components is configured to authenticate itself using at least one cryptographic key.

14. The system of claim 1, wherein the data connections established between the first and the second anchor components are encrypted.

15. The system of claim 1, wherein the one or more computers comprise at least one mobile device or embedded device.

16. The system of claim 1, wherein the second anchor component is configured to:
   morph messages from the first clinical device based on the clinical device communication protocol of the second clinical device.

17. The system of claim 1, wherein the first and second anchor components are configured to encrypt communication between the first and second anchor components with an encryption protocol not supported by the first or the second clinical device.

18. The system of claim 1, wherein the second anchor component is configured to:
   receive a request to establish a signaling connection with the first anchor component;
   upon authenticating credentials of the first anchor component, sending, to the first anchor component, a cryptographically signed service ticket including an identifier and public network address of the second anchor component; and
establishing the first data connection upon receipt of the service ticket from the first anchor component.

* * * * *